United States Patent
Mi et al.

(10) Patent No.: US 12,522,814 B2
(45) Date of Patent: Jan. 13, 2026

(54) FILM-FLIPPING MECHANISM FOR MOLECULAR TESTING, NUCLEIC ACID EXTRACTION DEVICE WITH THE SAME, AND NUCLEIC ACID EXTRACTION METHOD FOR MOLECULAR TESTING

(71) Applicant: DRSIGNAL BIOTECHNOLOGY CO., LTD., Taipei (TW)

(72) Inventors: Hsin-Wu Mi, Taipei (TW); Hsin-Fei Huang, New Taipei (TW)

(73) Assignee: DRSIGNAL BIOTECHNOLOGY CO., LTD., Taipei (TW)

( * ) Notice: Subject to any disclaimer, the term of this patent is extended or adjusted under 35 U.S.C. 154(b) by 778 days.

(21) Appl. No.: 17/870,277

(22) Filed: Jul. 21, 2022

(65) Prior Publication Data

US 2024/0026336 A1 Jan. 25, 2024

(51) Int. Cl.
| | | |
|---|---|---|
| *C12N 15/10* | (2006.01) | |
| *G01N 35/00* | (2006.01) | |
| *G01N 35/10* | (2006.01) | |

(52) U.S. Cl.
CPC ..... *C12N 15/1003* (2013.01); *G01N 35/0099* (2013.01); *G01N 35/1011* (2013.01); *G01N 2035/00465* (2013.01)

(58) Field of Classification Search
CPC ..... C12N 15/1003; G01N 2035/00465; G01N 2035/0405; G01N 2035/0406; G01N 2035/0418; G01N 35/0099; G01N 35/1011
See application file for complete search history.

(56) References Cited

U.S. PATENT DOCUMENTS

| | | | |
|---|---|---|---|
| 5,676,789 A | 10/1997 | Hamamura | |
| 6,189,302 B1 * | 2/2001 | Kudo | B65B 11/54 |
| | | | 294/902 |

(Continued)

FOREIGN PATENT DOCUMENTS

| | | |
|---|---|---|
| CN | 110352343 A | 10/2019 |
| CN | 113665922 A | 11/2021 |

(Continued)

OTHER PUBLICATIONS

Wang (WO2015192330) English Translation (Year: 2025).*

*Primary Examiner* — Jennifer Wecker
*Assistant Examiner* — Jonathan Bortoli
(74) *Attorney, Agent, or Firm* — Withrow + Terranova, PLLC; Vincent K. Gustafson

(57) ABSTRACT

A nucleic acid extraction device for molecular testing comprises a film-flipping mechanism, a cap mechanism, a dispensing mechanism, an extraction plate transfer mechanism, and a nucleic acid extraction module. A sealing film is adhered onto top of an extraction plate and folded along an outer edge of the extraction plate. A film-flipping head of the film-flipping mechanism abuts against a bottom surface of the extraction plate and pushes an edge of the sealing film to unfold the sealing film. A film gripper clamps and removes the unfolded sealing film. The cap mechanism opens the specimen containers. The dispensing mechanism transfers the specimens from the specimen containers to the extraction plate. The extraction plate transfer mechanism moves the extraction plate with the specimens to the nucleic acid extraction module. As a result, molecular testing is automated to reduce labor and improve quality.

7 Claims, 24 Drawing Sheets

(56) References Cited

U.S. PATENT DOCUMENTS

| | | | |
|---|---|---|---|
| 10,781,091 B2 | 9/2020 | Procyshyn et al. | |
| 2003/0143124 A1 | 7/2003 | Roberts et al. | |
| 2016/0023203 A1* | 1/2016 | Richardson | B01L 3/0279 |
| | | | 901/41 |
| 2019/0369134 A1* | 12/2019 | Wu | G01N 1/28 |
| 2023/0280361 A1* | 9/2023 | Gao | B01L 7/52 |
| | | | 435/287.2 |

FOREIGN PATENT DOCUMENTS

| | | | | |
|---|---|---|---|---|
| CN | 216192208 U | 4/2022 | | |
| TW | M505455 U | 7/2015 | | |
| WO | WO-2015192330 A1 * | 12/2015 | | C12N 15/00 |

* cited by examiner

FILM-FLIPPING MECHANISM FOR MOLECULAR TESTING, NUCLEIC ACID EXTRACTION DEVICE WITH THE SAME, AND NUCLEIC ACID EXTRACTION METHOD FOR MOLECULAR TESTING

BACKGROUND OF THE INVENTION

1. Field of the Invention

The present invention relates to an automation equipment for biology and chemistry laboratories, especially to a nucleic acid extraction device for molecular testing.

2. Description of the Prior Art

In a molecular testing such as a RNA detection for COVID-19 (coronavirus disease 2019), a first step is to perform nucleic acid extraction process to collected specimens that are each stored in a specimen container. In the nucleic acid extraction process, first peel off a sealing film on top of a 96-well plate for nucleic acid extraction, and then transfer 96 of the collected specimens to the 96-well plate. To be specific, the 96 specimen containers need to be opened one by one in order to transfer each of the 96 collected specimens to a respective one of the wells on the 96-well plate.

After transferring the collected specimens, the 96 specimen containers need to be sealed carefully and be disposed of as medical waste, and the 96-well plate for nucleic acid extraction is placed into a nucleic acid extraction machine to prepare the collected specimens for a Q-PCR (Real-time Quantitative Polymerase Chain Reaction) test later on.

However, peeling off the sealing films and transferring the collected specimens are operated manually in the conventional nucleic acid extraction process, making the process time-consuming and laborious. Moreover, the risk of human error and contamination due to manual operation is also considerable, affecting test precision and personnel safety.

To overcome the shortcomings, the present invention provides a film-flipping mechanism for molecular testing, a nucleic acid extraction device with the same, and a nucleic acid extraction method for molecular testing to mitigate or obviate the aforementioned problems.

SUMMARY OF THE INVENTION

The main objective of the present invention is to provide a film-flipping mechanism for molecular testing, a nucleic acid extraction device with the same, and a nucleic acid extraction method for molecular testing to automate nucleic acid extraction process to reduce labor and improve quality.

The film-flipping mechanism for molecular testing is configured to remove a sealing film from an extraction plate. A flange protrudes from an outer annular surface on a top of the extraction plate. The sealing film is adhered onto a top surface of the extraction plate. The sealing film is folded along an outer edge of the flange such that a folded peripheral portion of the sealing film is disposed under the flange of the extraction plate. The film-flipping mechanism comprises a film-flipping seat, a film-flipping assembly, and a film gripper. The film-flipping seat is configured to fix the extraction plate. The film-flipping assembly is mounted on the film-flipping seat and is movable toward the folded peripheral portion of the sealing film. The film-flipping assembly has a film-flipping head protruding from a top surface of the film-flipping assembly and configured to abut against a bottom surface of the flange of the extraction plate. When the film-flipping assembly is moved toward the folded peripheral portion, a side surface of the film-flipping head pushes the folded peripheral portion to unfold the folded peripheral portion such that the folded peripheral portion is flipped from an underside of the flange to a lateral side of the flange. The film gripper is movably and rotatably disposed on the film-flipping seat. The film gripper is configured to clamp the folded peripheral portion that is flipped to the lateral side of the flange and peel the sealing film away from the extraction plate.

The nucleic acid extraction device for molecular testing is configured to process multiple specimen containers and an extraction plate. Each of the specimen containers has a containing body and a cap. Each of the specimen containers has a specimen placed therein and sealed by the cap. The extraction plate has multiple extraction recesses and a sealing film. The sealing film is adhered onto a top of the extraction plate and seals the extraction recesses. The nucleic acid extraction has a main base, a film-flipping mechanism, a cap mechanism, a dispensing mechanism, an extraction plate transfer mechanism, and a nucleic acid extraction module. The film-flipping mechanism, the cap mechanism, the dispensing mechanism, the extraction plate transfer mechanism, and the nucleic acid extraction module are mounted on the main base. The film-flipping mechanism is configured to remove the sealing film from the extraction plate. A flange protrudes from an outer annular surface on a top of the extraction plate. The sealing film is folded along an outer edge of the flange such that a folded peripheral portion of the sealing film is disposed under the flange of the extraction plate. The film-flipping mechanism comprises a film-flipping seat, a film-flipping assembly, and a film gripper. The film-flipping seat is mounted on the main base and is configured to fix the extraction plate. The film-flipping assembly is mounted on the film-flipping seat and is movable toward the folded peripheral portion of the sealing film. The film-flipping assembly has a film-flipping head protruding from a top surface of the film-flipping assembly and configured to abut against a bottom surface of the flange of the extraction plate. When the film-flipping assembly is moved toward the folded peripheral portion, a side surface of the film-flipping head pushes the folded peripheral portion to unfold the folded peripheral portion such that the folded peripheral portion is flipped from an underside of the flange to a lateral side of the flange. The film gripper is movably and rotatably disposed on the film-flipping seat. The film gripper is configured to clamp the folded peripheral portion flipped to the lateral side of the flange and peel the sealing film away from the extraction plate. The cap mechanism is configured to separate the cap of each of the specimen containers from the corresponding containing body. The dispensing mechanism has at least one pipette. Each of the at least one pipette is configured to aspirate the specimen in one of the specimen containers and inject the aspirated specimen into one of the extraction recesses of the extraction plate. The extraction plate transfer mechanism is configured to move the extraction plate having the specimens injected in the extraction recess to the nucleic acid extraction module.

A nucleic acid extraction method for molecular testing comprises steps as follows:
(a) Preparation of extraction plate and specimens, wherein an extraction plate is prepared; a flange protrudes from an outer annular surface on a top of the extraction plate; a sealing film is adhered onto a top surface of the extraction plate; the sealing film is folded along an outer edge of the flange such that a folded peripheral portion of the sealing film is disposed under the flange of the extraction plate; a film-flipping head of a film-flipping mechanism abuts against a bottom surface of the flange of the extraction plate, and meanwhile moves the film-flipping head toward the folded peripheral portion of the sealing film to push the folded peripheral portion such that the folded peripheral portion is flipped from an underside of the flange to a lateral side of the flange; a film gripper clamps the folded peripheral portion that is flipped to the lateral side of the flange, and then the film gripper moves and rotates to peel the sealing film away from the extraction plate; a cap mechanism separates a cap from a containing body of one of multiple specimen containers.

(b) Dispensing and extraction, wherein each of at least one pipette of a dispensing mechanism aspirates a specimen inside one of the specimen containers and injects the aspirated specimen into one of multiple extraction recesses of the extraction plate, and then the cap mechanism and the dispensing mechanism continue to process rest of the specimen containers such that rest of the specimens in said specimen containers are injected into rest of the extraction recesses on the extraction plate; an extraction plate transfer mechanism moves the extraction plate with the specimens inside the extraction recesses to a nucleic acid extraction module.

The advantage of the present invention is that the film-flipping mechanism automatically separates the sealing film from the extraction plate; the cap mechanism automatically opens up the specimen container; the dispensing mechanism automatically transfers the specimens from the specimen containers to the extraction plate; the extraction plate transfer mechanism automatically moves the extraction plate to the nucleic acid extraction module to perform nucleic acid extraction process. As a result, nucleic acid extraction is highly automated to greatly reduce labor and improve processing quality.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
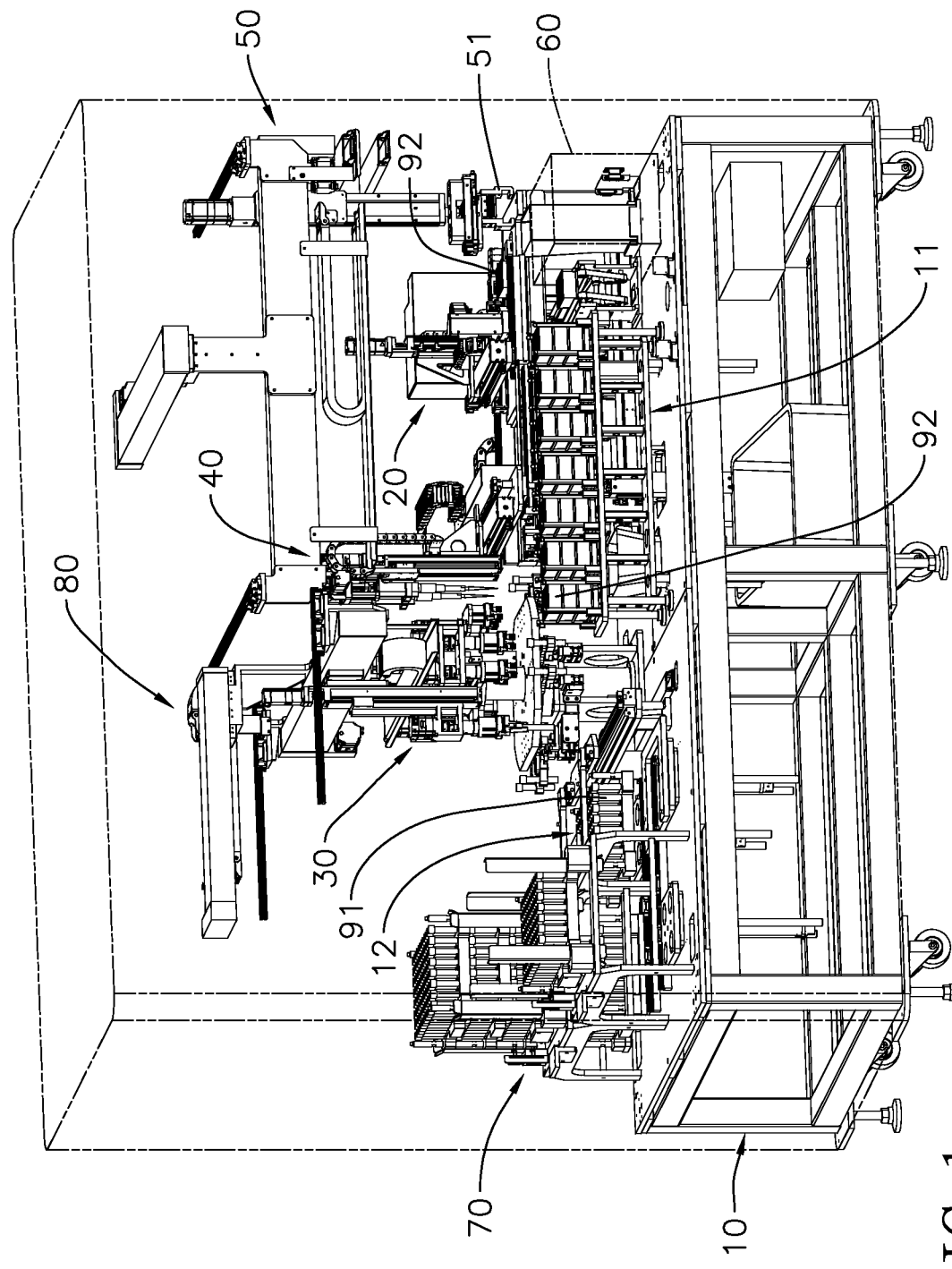
FIG. 1 is a perspective view of a nucleic acid extraction device for molecular testing in accordance with the present invention.

With reference to FIGS. 1, 3, 18, 19, and 23, a nucleic acid extraction device for molecular testing in accordance with the present invention is configured to process multiple specimen containers 91 and an extraction plate 92. Each of the specimen containers 91 has a containing body 911 and a cap 912, and a liquid specimen is sealed in the containing body 911 by the cap 912. The extraction plate 92 has multiple extraction recesses 921 and a sealing film 922; the sealing film 922 is adhered onto a top surface of the extraction plate 92 and seals all the extraction recesses 921.

A flange 923 protrudes from an outer annular surface on a top of the extraction plate 92. The flange 923 is preferably annular and surrounds the extraction plate 92. The sealing film 922 is folded along an outer edge of the flange 923 such that a folded peripheral portion 9221 of the sealing film 922 is disposed under the flange 923 of the extraction plate 92.

To be precise, a number of the extraction recesses 921 on the extraction plate 92 is 96, and the extraction recesses 921 are formed on the top surface of the extraction plate 92. The containing body 911 of each of the specimen containers 91 is a tube. The specimen containers 91 are delivered into the nucleic acid extraction device by multiple specimen-organizing plates 93, and each of the specimen-organizing plates 93 has 96 specimen containers 91 mounted thereon.

Main function of the nucleic acid extraction device is to transfer the specimen inside each of the 96 specimen containers 91 into a respective one of the 96 extraction recesses 921 on the extraction plate 92, and then carry out other processes to the extraction plate 92.

The nucleic acid extraction device has: a main base 10, a film-flipping mechanism 20, a cap mechanism 30, a dispensing mechanism 40, an extraction plate transfer mechanism 50, and a nucleic acid extraction module 60, wherein the film-flipping mechanism 20, the cap mechanism 30, the dispensing mechanism 40, the extraction plate transfer mechanism 50, and the nucleic acid extraction module 60 are mounted on the main base 10. In the preferred embodiment the nucleic acid extraction device has a specimen-supplying mechanism 70 and a specimen transfer module 80.

Figure 2:
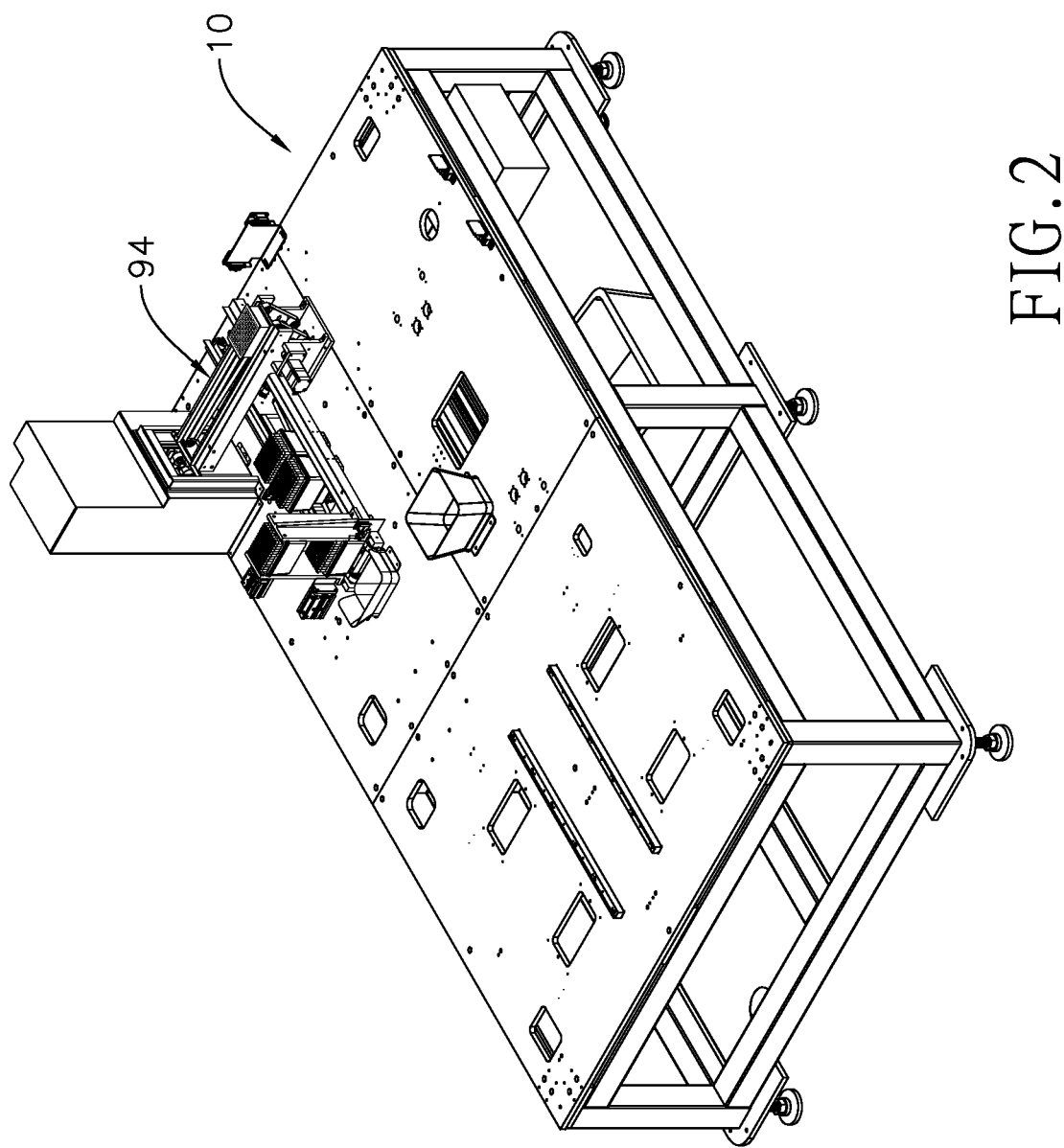
FIG. 2 is a perspective view of a main base and an extraction plate output mechanism of the nucleic acid extraction device in FIG. 1.
Figure 4:
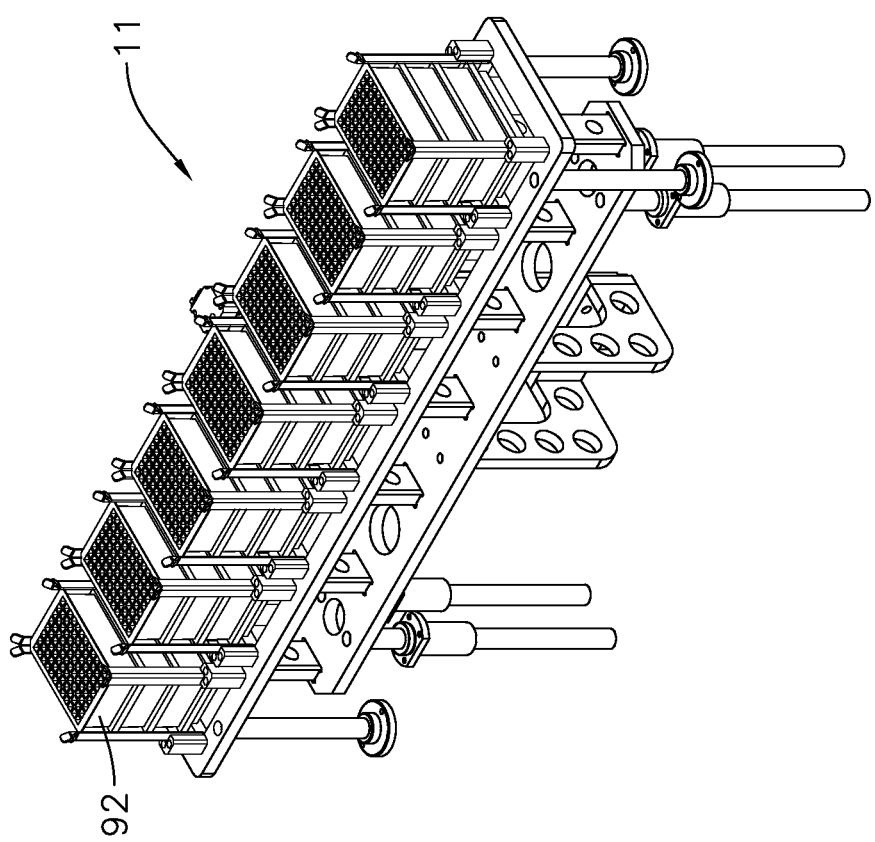
FIG. 4 is a perspective view of a plate rack of the nucleic acid extraction device in FIG. 1.

With reference to FIGS. 1, 2, and 4, a plate rack 11 is mounted on the main base 10. The plate rack 11 forms multiple stacking spaces that are independent from each other. Multiple unused extraction plates 92 are stacked in one of the stacking spaces, and plates with different extraction medicines are stacked in the rest of the stacking spaces.

With reference to FIGS. 1 and 14-18, the film-flipping mechanism 20 is configured to remove the sealing film 922 from the extraction plate 92. The film-flipping mechanism 20 comprises a film-flipping seat 21, a film-flipping assembly 25, and a film gripper 27. In the preferred embodiment, the film-flipping mechanism 20 has a first linear module 22, a second linear module 23, a third linear module 24, and a gripper-rotating seat 26.

The film-flipping seat 21 is mounted on the main base 10 and is configured to fix the extraction plate 92 in place. To be specific, a positioning recess is formed on the film-flipping seat 21, and multiple clamping cylinders 211 are mounted on the film-flipping seat 21. A bottom of the extraction plate 92 can be placed in the positioning recess, and then the clamping cylinders 211 are used to fix the extraction plate 92 in the positioning recess.

Figure 16:
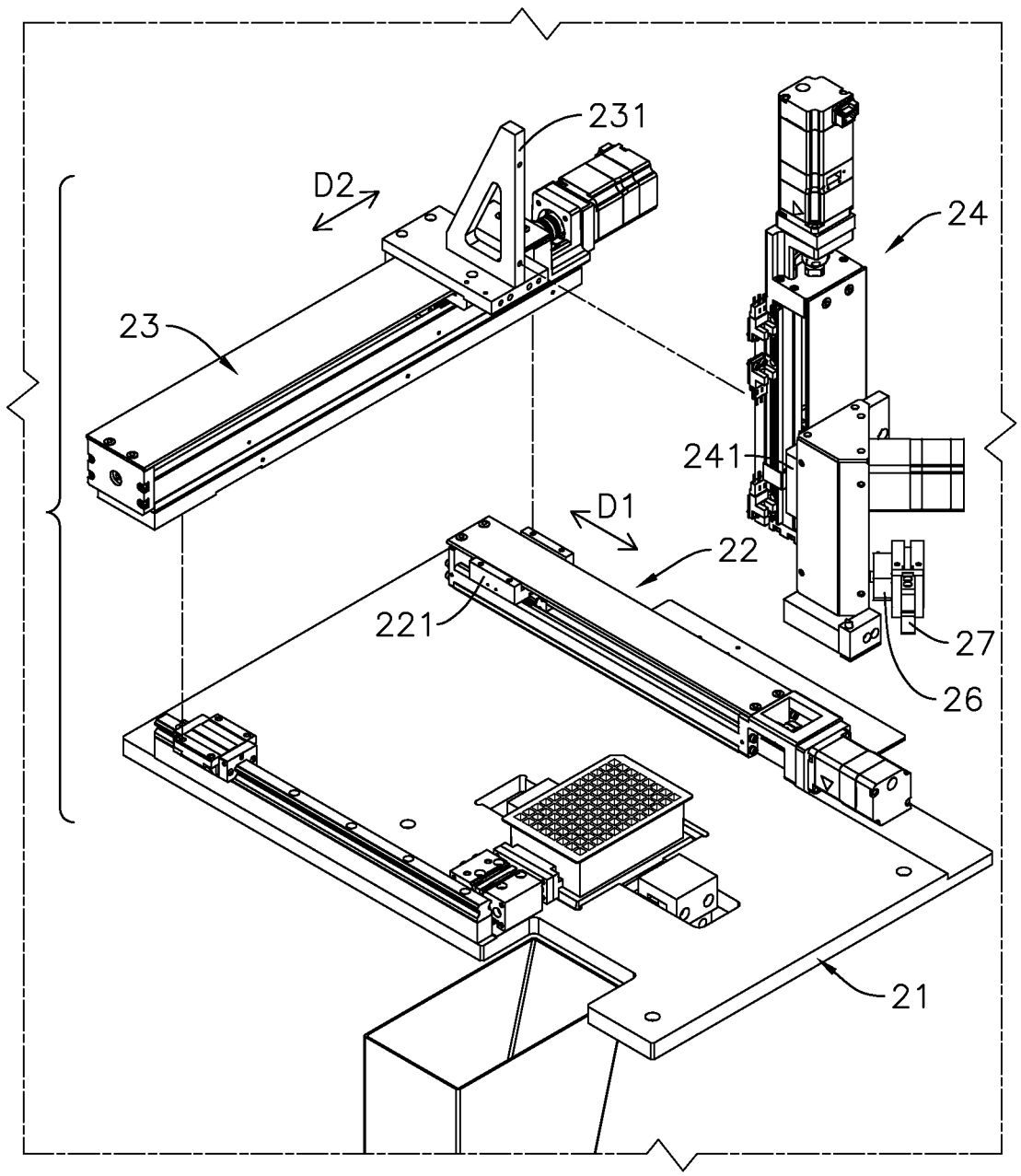
FIG. 16 is an exploded perspective view of the film-flipping mechanism of the nucleic acid extraction device in FIG. 15.

The first linear module 22 is mounted on the film-flipping seat 21 and has a first slider 221 (as shown in FIG. 16). The first slider 221 is movable along a first direction D1 and movement of the first slider 221 is controllable.

The second linear module 23 is mounted on the first slider 221 of the first linear module 22 and has a second slider 231. The second slider 231 is movable along a second direction D2 and movement of the second slider 231 is controllable, wherein the second direction D2 is non-parallel to the first direction D1. To be precise, the first direction D1, the second direction D2, and a direction along which the third slider 241 moves are perpendicular to each other.

Figure 18:
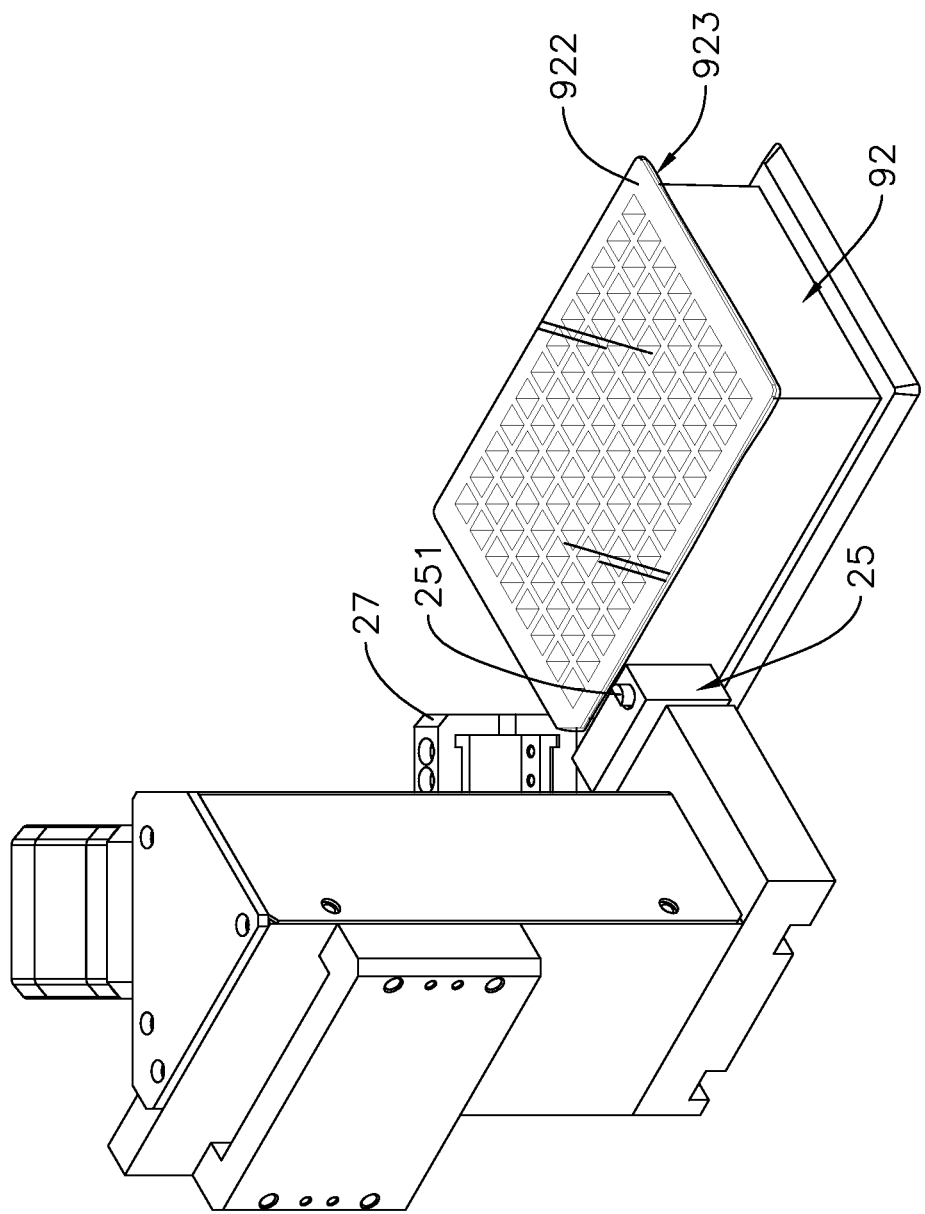
FIG. 18 is another perspective view of the film-flipping mechanism of the nucleic acid extraction device in FIG. 15.
Figure 19:
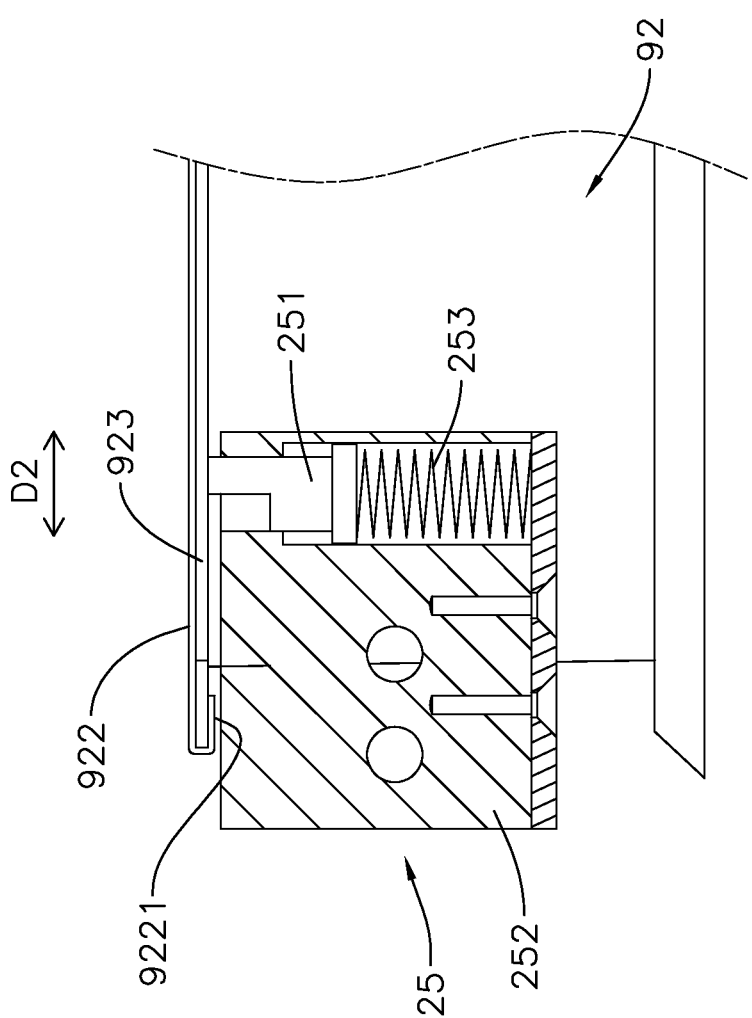
FIGS. 19 and 20 are operational side views of the film-flipping mechanism of the nucleic acid extraction device in FIG. 15, showing a film flipping head pushing a folded peripheral portion of a seal film to unfold the folded peripheral portion.
Figure 20:
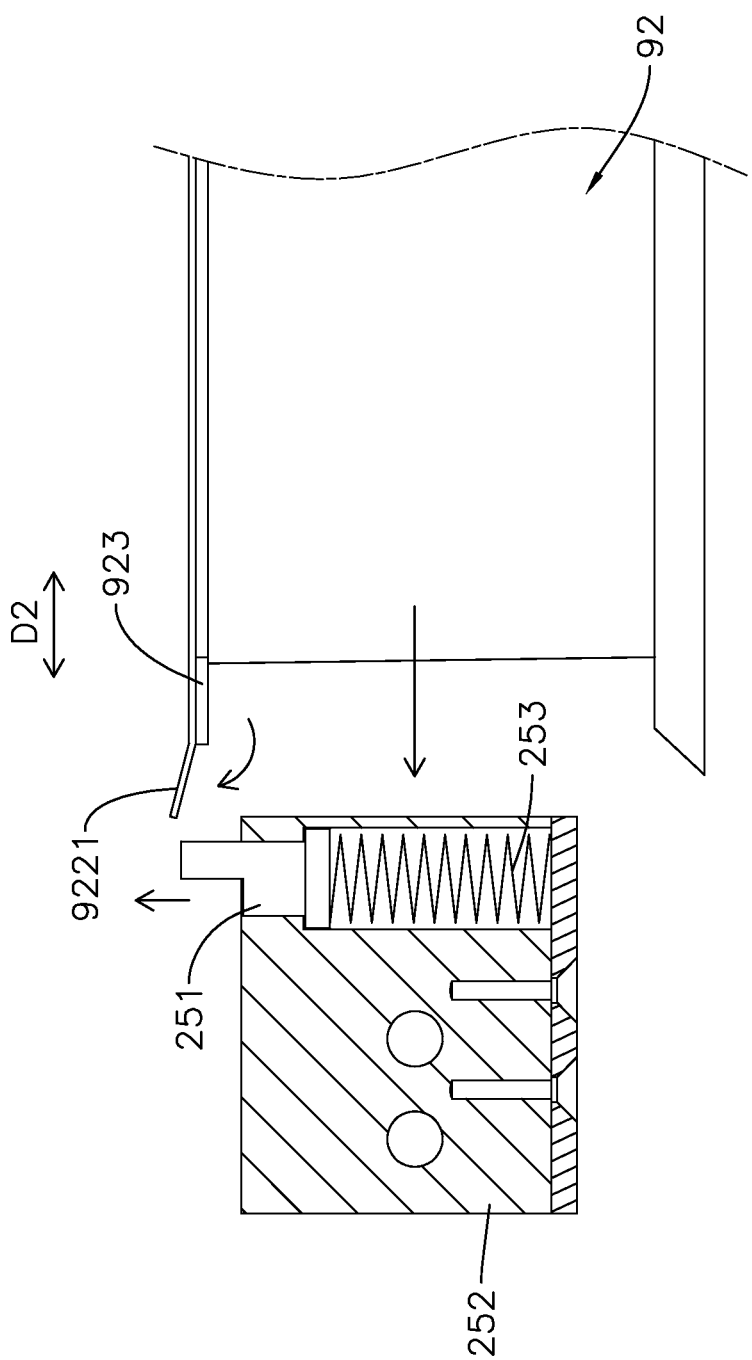

With reference to FIGS. 18 to 20, the film-flipping assembly 25 is mounted on the third slider 241 such that the film-flipping assembly 25 is movable toward the folded peripheral portion 9221 of the sealing film 922, but the film-flipping assembly 25 is not limited thereto as long as the film-flipping assembly 25 is mounted on the film-flipping seat 21 and is movable toward the folded peripheral portion 9221 of the sealing film 922.

The film-flipping assembly 25 has a film-flipping head 251, a film-flipping body 252, and a raising resilient element 253. An accommodating recess is formed on a top surface of the film-flipping body 252. The film-flipping head 251 is slidably mounted in the accommodating recess of the film-flipping body 252 and is slidable upwards and downwards.

An upper end of the film-flipping head 251 protrudes from the top surface of the film-flipping body 252 and forms a right angle. The upper end of the film-flipping head 251 is configured to abut against a bottom surface of the flange 923 of the extraction plate 92; as a result, when the film-flipping assembly 25 is moved toward the folded peripheral portion 9221 of the sealing film 922, a side surface of the film-flipping head 251 pushes the folded peripheral portion 9221 to unfold the folded peripheral portion 9221 such that the folded peripheral portion 9221 is flipped from an underside of the flange to a lateral side of the flange 923.

The raising resilient element 253 is mounted in the accommodating recess of the film-flipping body 252 and drives the film-flipping head 251 to move upwards such that the tip of the film-flipping head 251 tends to protrude from the top surface of the film-flipping body 252 and keeps abutting the bottom surface of the flange 923.

Figure 17:
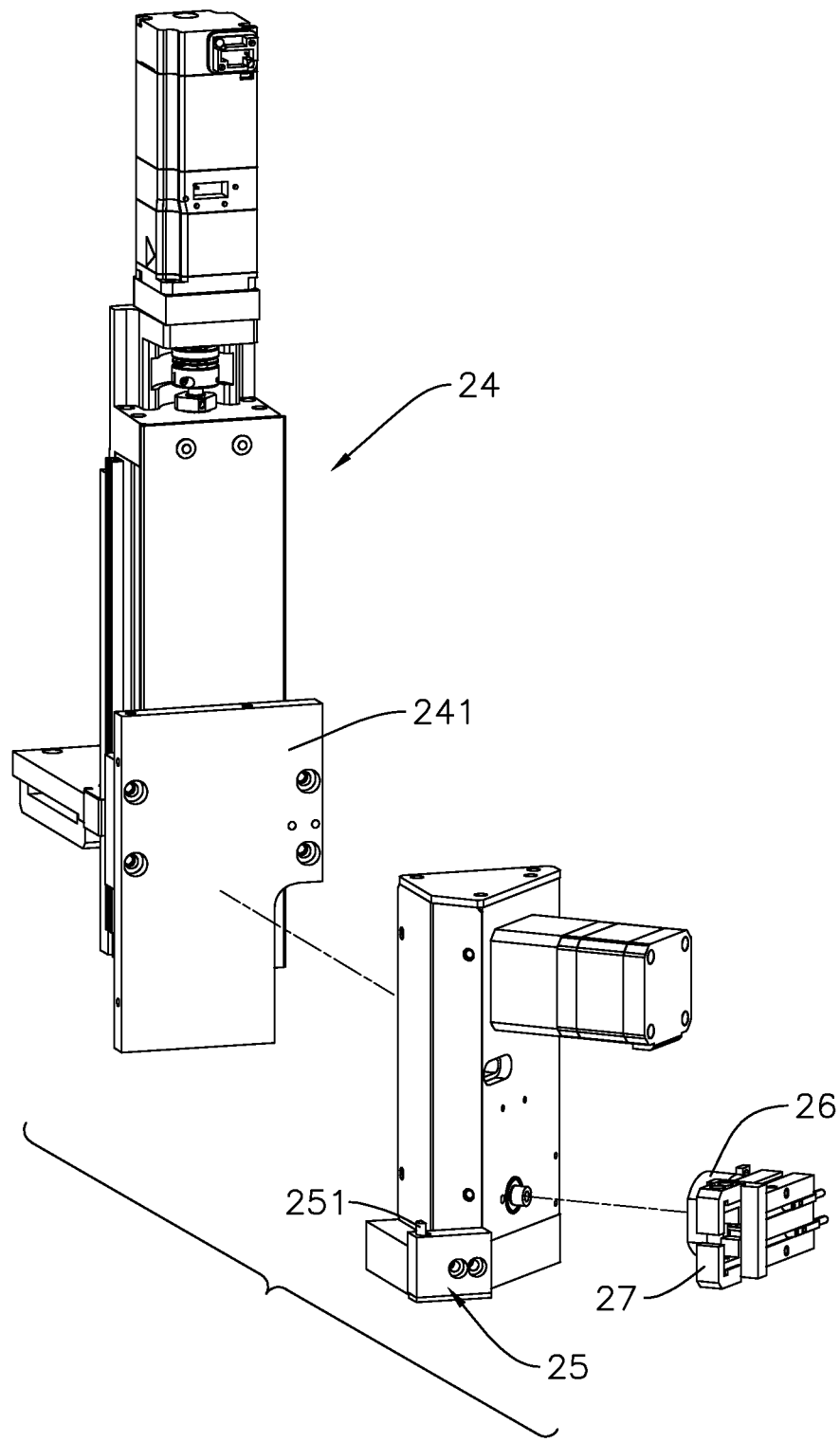
FIG. 17 is a partial exploded perspective view of the film-flipping mechanism of the nucleic acid extraction device in FIG. 15.
Figure 21:
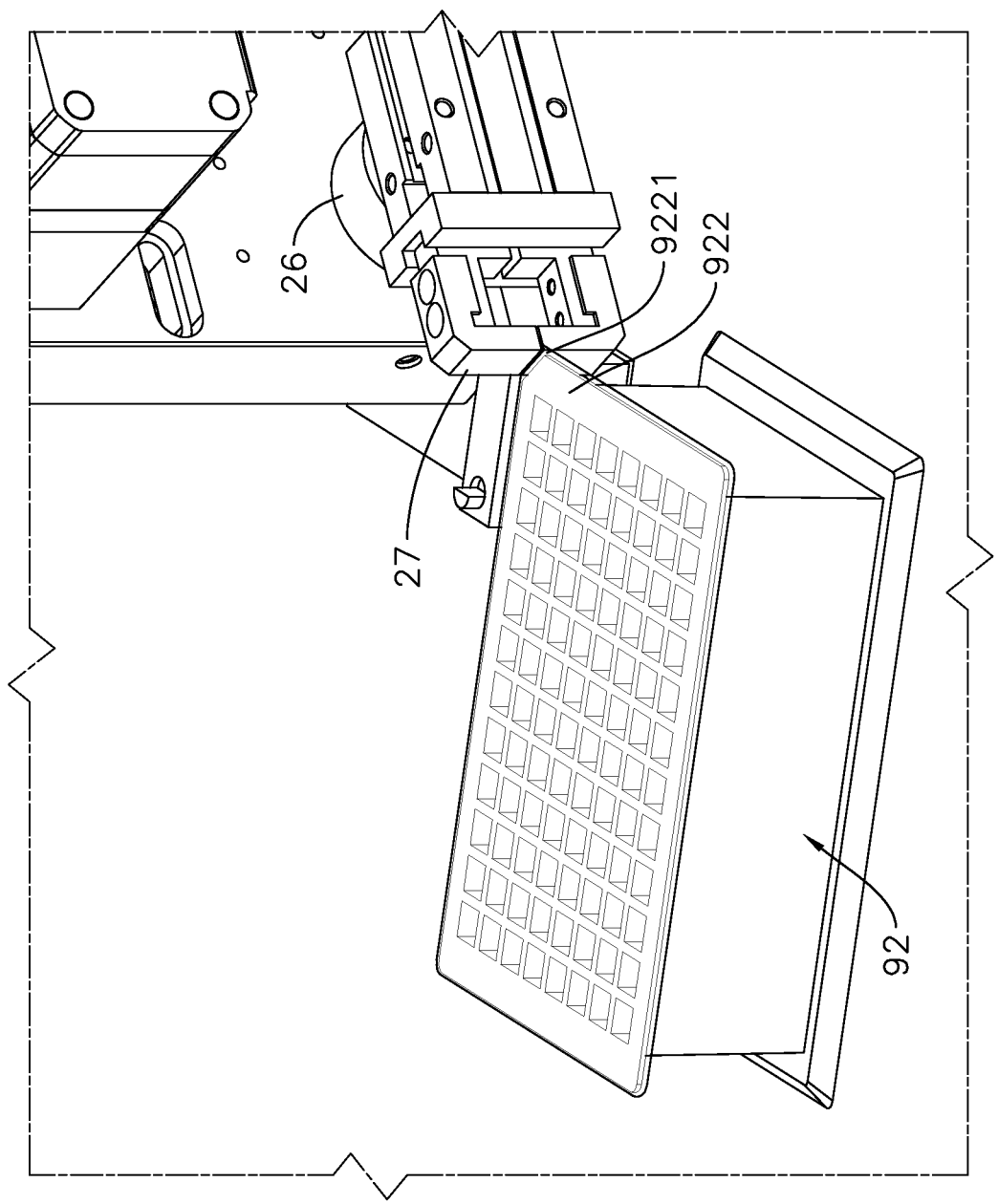
FIGS. 21 and 22 are operational perspective views of the film-flipping mechanism of the nucleic acid extraction device in FIG. 15, showing a film gripper peeling the seal film off the extraction plate.
Figure 22:
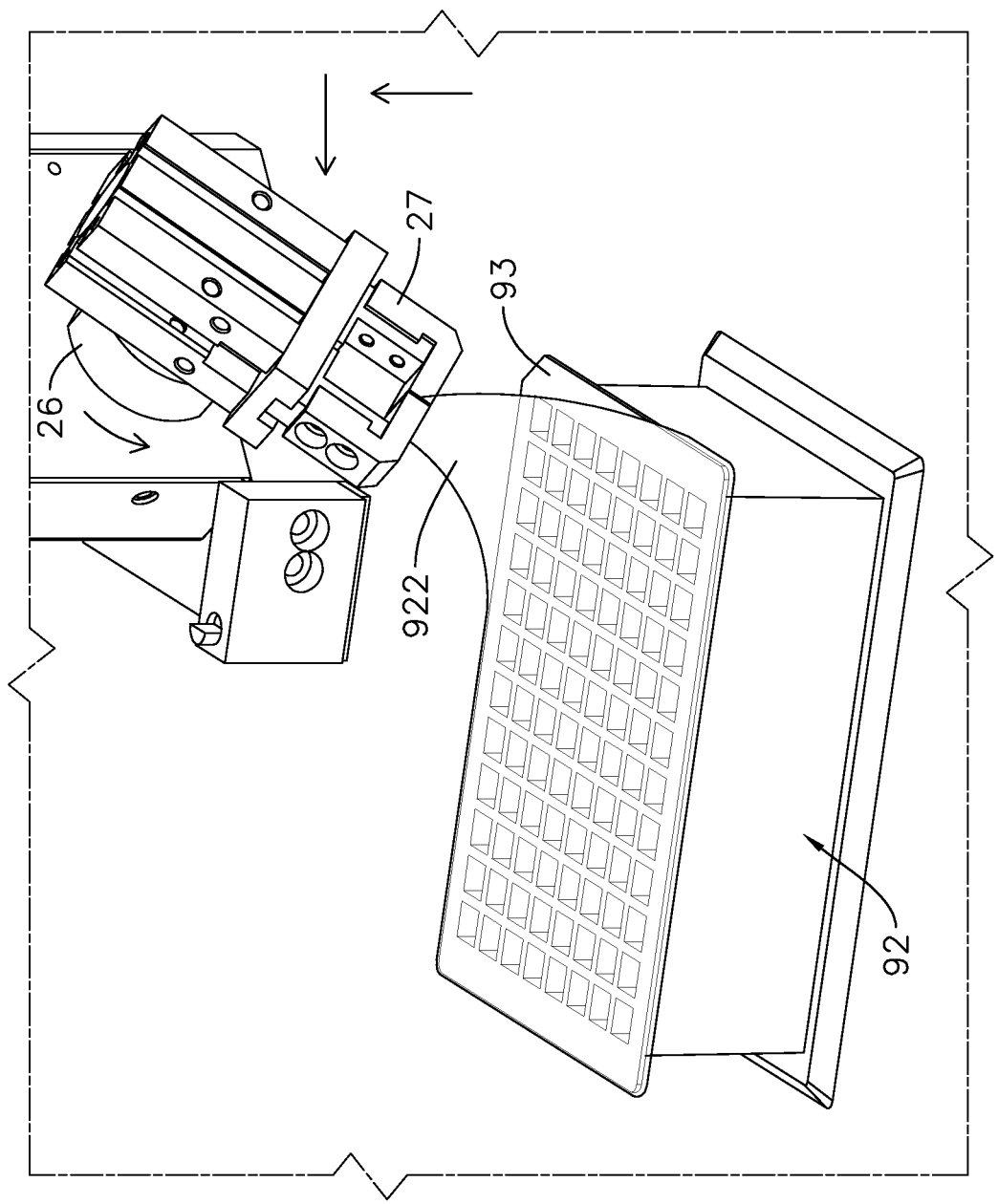

With reference to FIGS. 17, 21, and 22, the gripper-rotating seat 26 is rotatably mounted on the third slider 241 of the third linear module 24. The film gripper 27 is mounted on the gripper-rotating seat 26 such that the film gripper 27 is movably and rotatably disposed on the film-flipping seat 21. The film gripper 27 is configured to clamp the folded peripheral portion 9221 that is flipped to the lateral side of the flange 923 and peel the sealing film 922 away from the extraction plate 92 via the movement from the linear module 22, 23, 24 and the rotation from the gripper-rotating seat 26.

Figure 3:
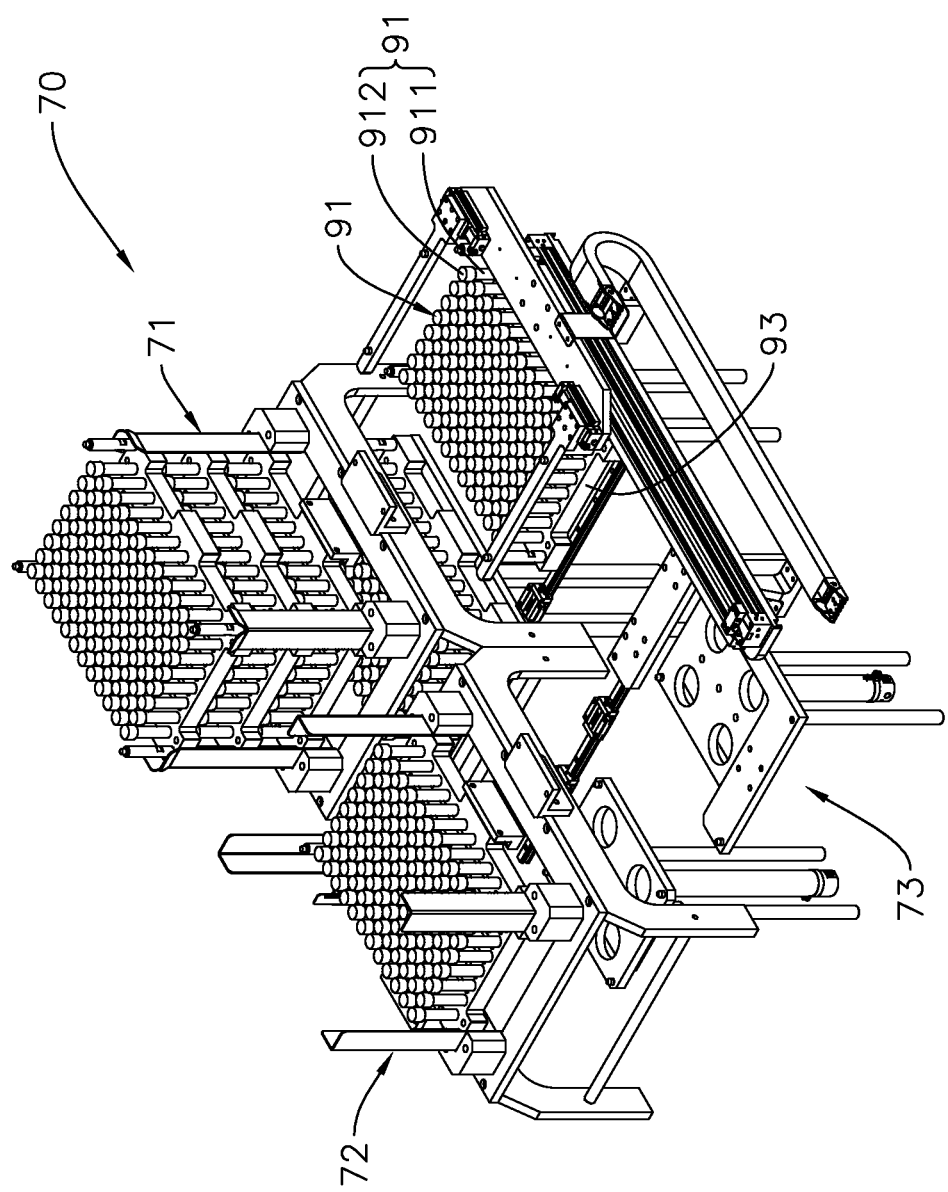
FIG. 3 is a perspective view of a specimen-supplying mechanism of the nucleic acid extraction device in FIG. 1.

With reference to FIGS. 1 and 3, the specimen-supplying mechanism 70 is configured to transfer the unprocessed specimen containers 91 to an organizing area 12 on the main base 10. The specimen-supplying mechanism 70 includes an input rack 71, an output rack 72, and a specimen plate transfer mechanism 73. The specimen-organizing plates 93 are vertically stacked in the input rack 71. The unprocessed specimen containers 91 are disposed on the specimen-organizing plates 93. The specimen plate transfer mechanism 73 is configured to move the bottommost specimen-organizing plate 93 in the input rack 71 to the organizing area 12 on the main base 10 for subsequent processes.

After all the specimen containers 91 on one of the specimen-organizing plates 93 are processed, the specimen plate transfer mechanism 73 moves said specimen-organizing plate 93 from the organizing area 12 into the output rack 72 for storage. The specimen-supplying mechanism 70 is a conventional mechanism; therefore detailed description of the specimen-supplying mechanism 70 is omitted.

Figure 7:
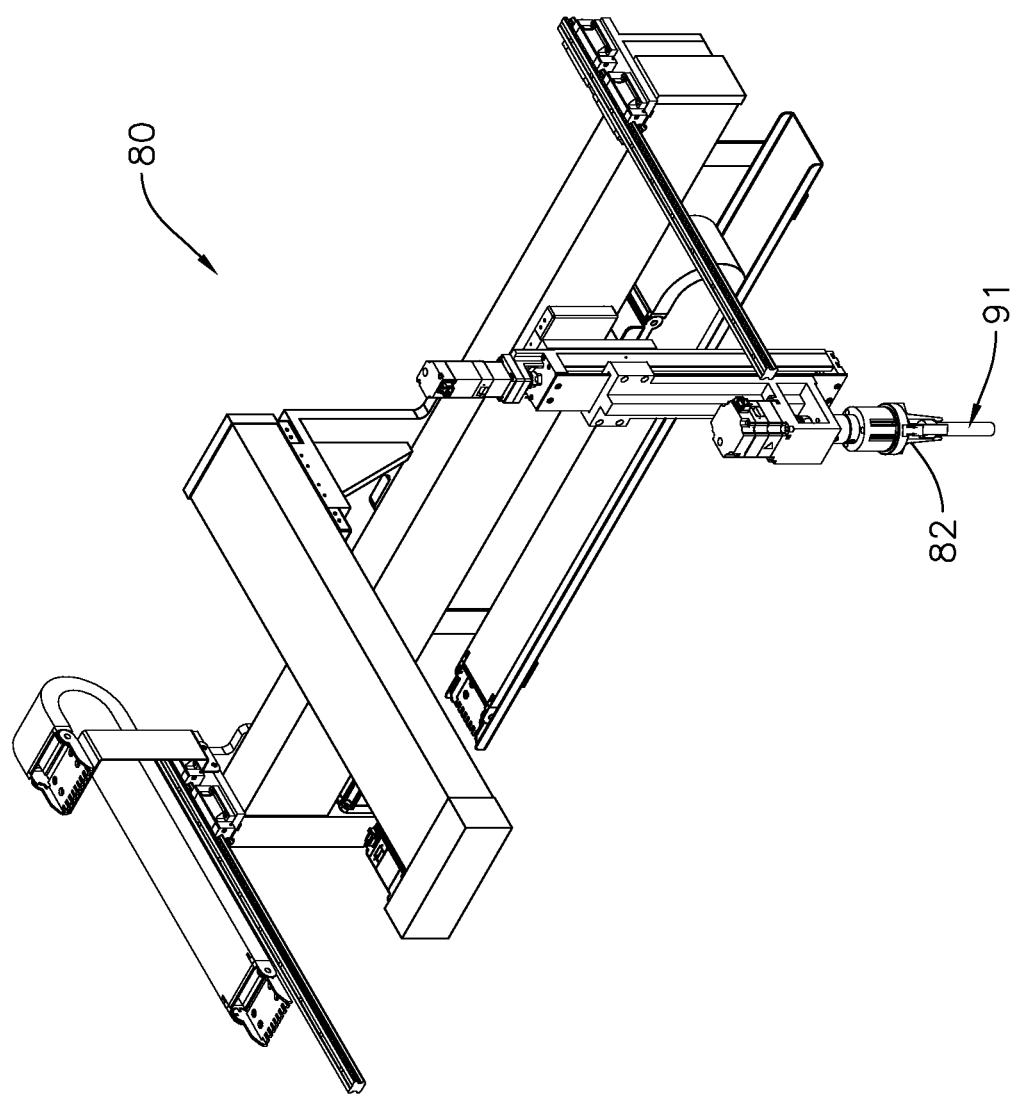
FIG. 7 is a perspective view of a specimen transfer module of the nucleic acid extraction device in FIG. 1.
Figure 8:
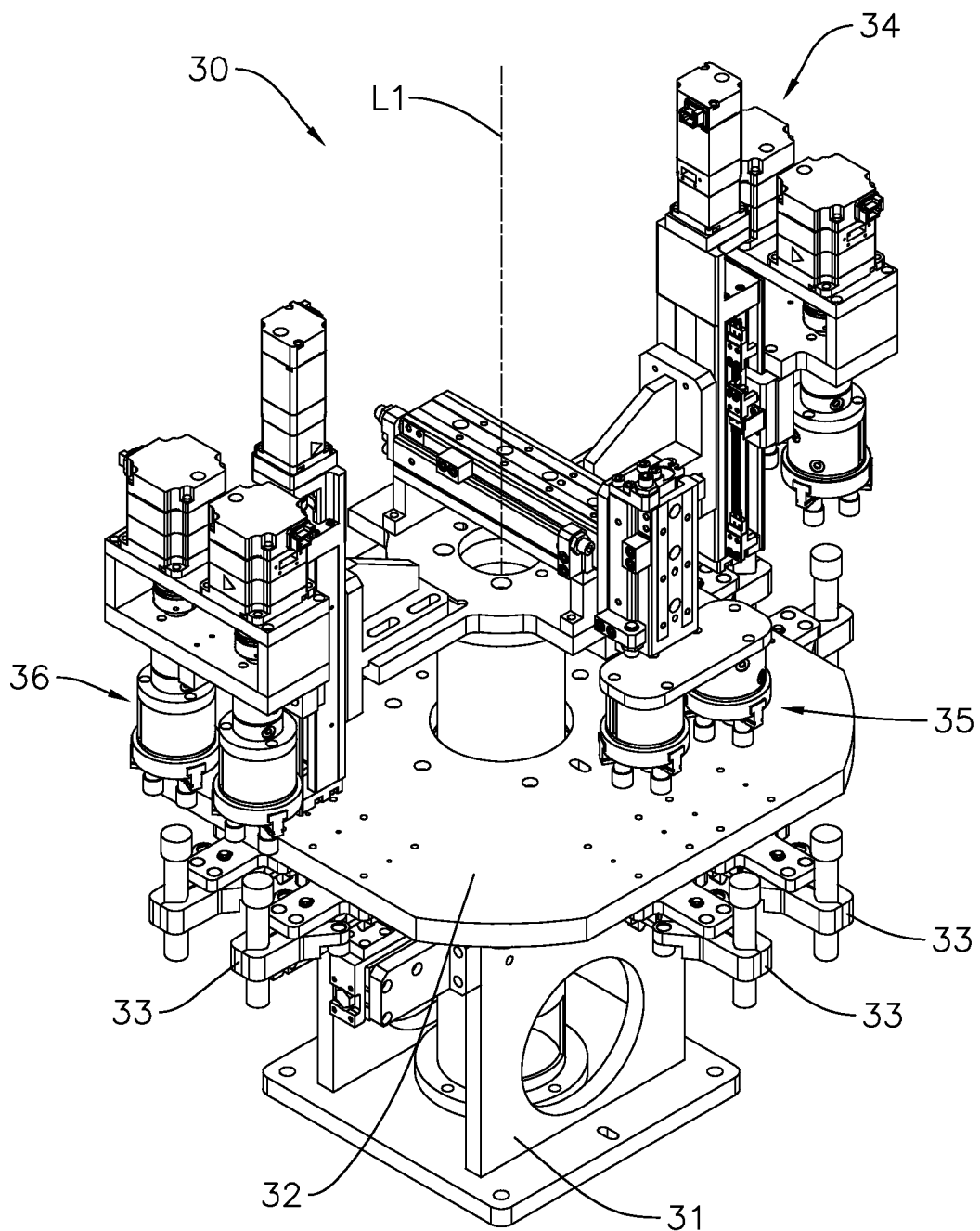
FIG. 8 is a perspective view of a cap mechanism of the nucleic acid extraction device in FIG. 1.
Figure 10:
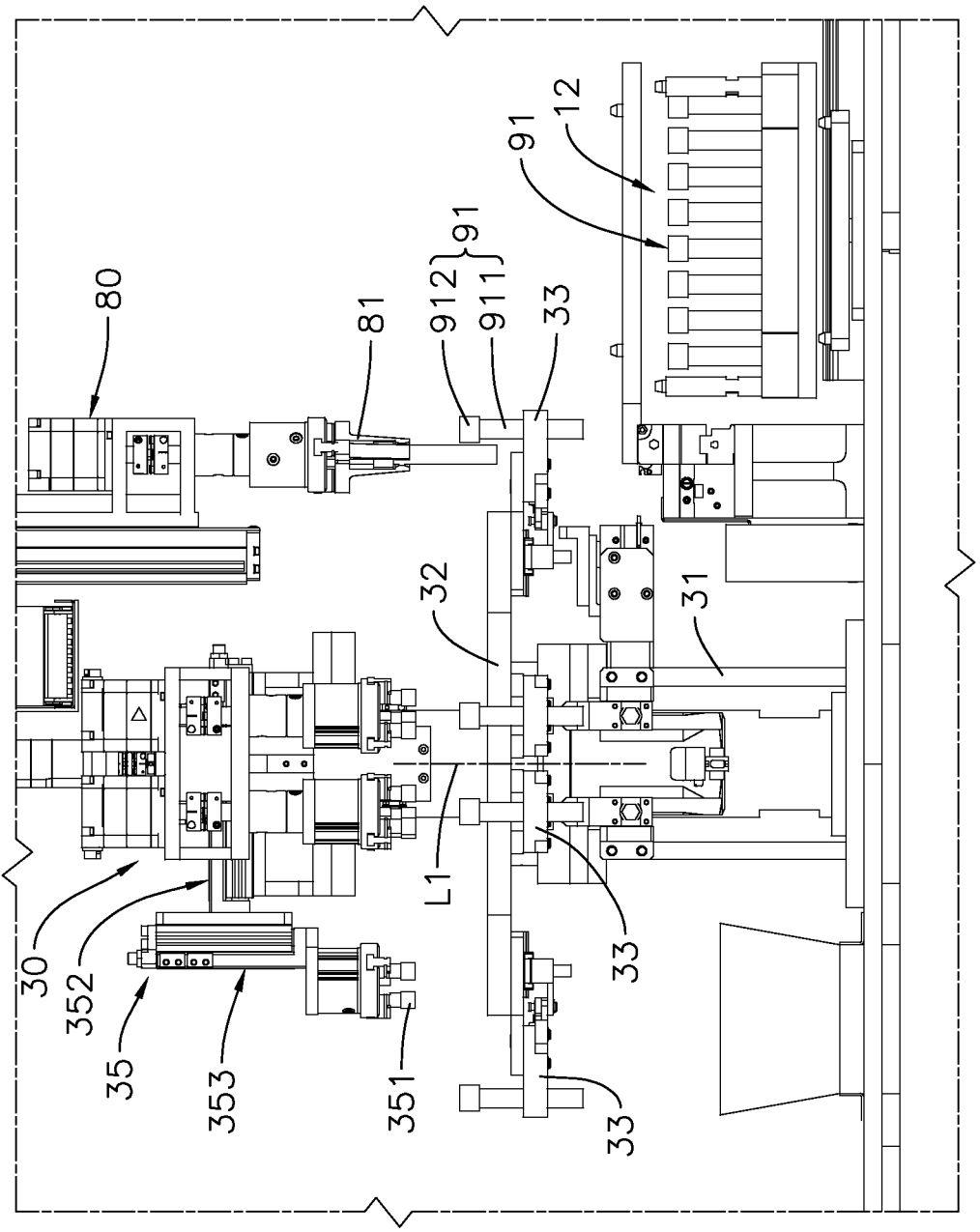
FIG. 10 is an enlarged rear view of the nucleic acid extraction device in FIG. 1.

With reference to FIGS. 1, 7 and 10, the specimen transfer module 80 is mounted on the main base 10 and has a container gripper 81. The container gripper 81 is movable between the organizing area 12 and the cap mechanism 30. The container gripper 81 is configured to clamp one of the specimen containers 91 on the organizing area 12 and transfer said specimen container 91 to the cap mechanism 30.

With reference to FIGS. 1 and 8-10, the cap mechanism 30 is configured to separate the cap 912 of each of the specimen containers 91 from the corresponding containing body 911. In the preferred embodiment, the cap mechanism 30 includes a fixing seat 31, a rotating table 32, multiple containing body fixtures 33, a cap-loosening assembly 34, a cap-moving assembly 35, and a cap-tightening assembly 36.

The fixing seat 31 is mounted on the main base 10. The rotating table 32 is mounted on the fixing seat 31 and is rotatable around a rotation axis L1. The containing body fixtures 33 are mounted on the rotating table 32 and are preferably annularly disposed apart from each other around the rotation axis L1 along a periphery of the rotating table 32.

To be precise, a number of the containing body fixtures 33 is eight. The containing body fixtures 33 are divided into four sets that are annularly disposed apart from each at same interval. Each of the containing body fixtures 33 is capable of clamping one of the specimen containers 91.

Figure 9:
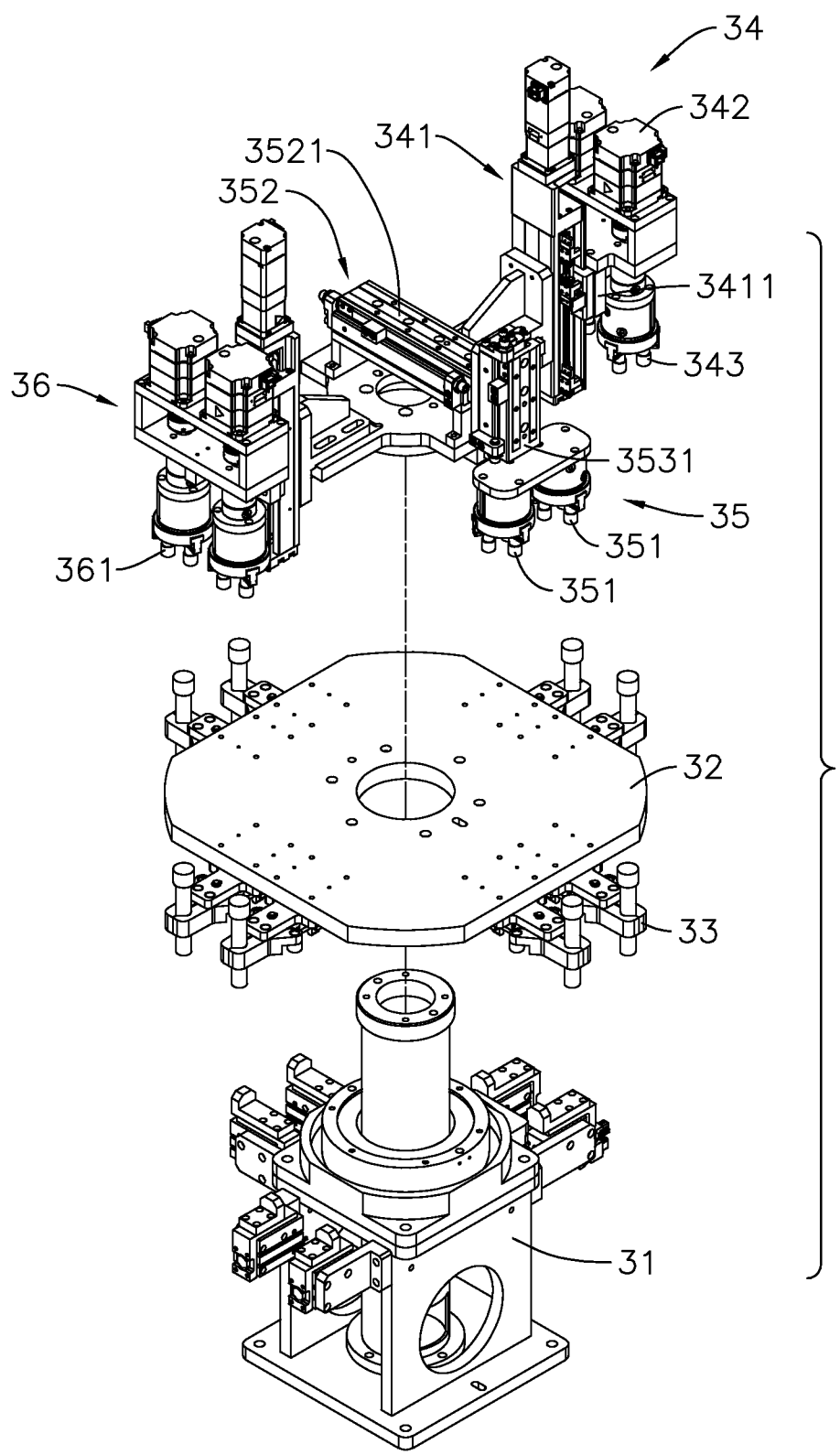
FIG. 9 is an exploded perspective view of the cap mechanism of the nucleic acid extraction device in FIG. 8.
Figure 11:
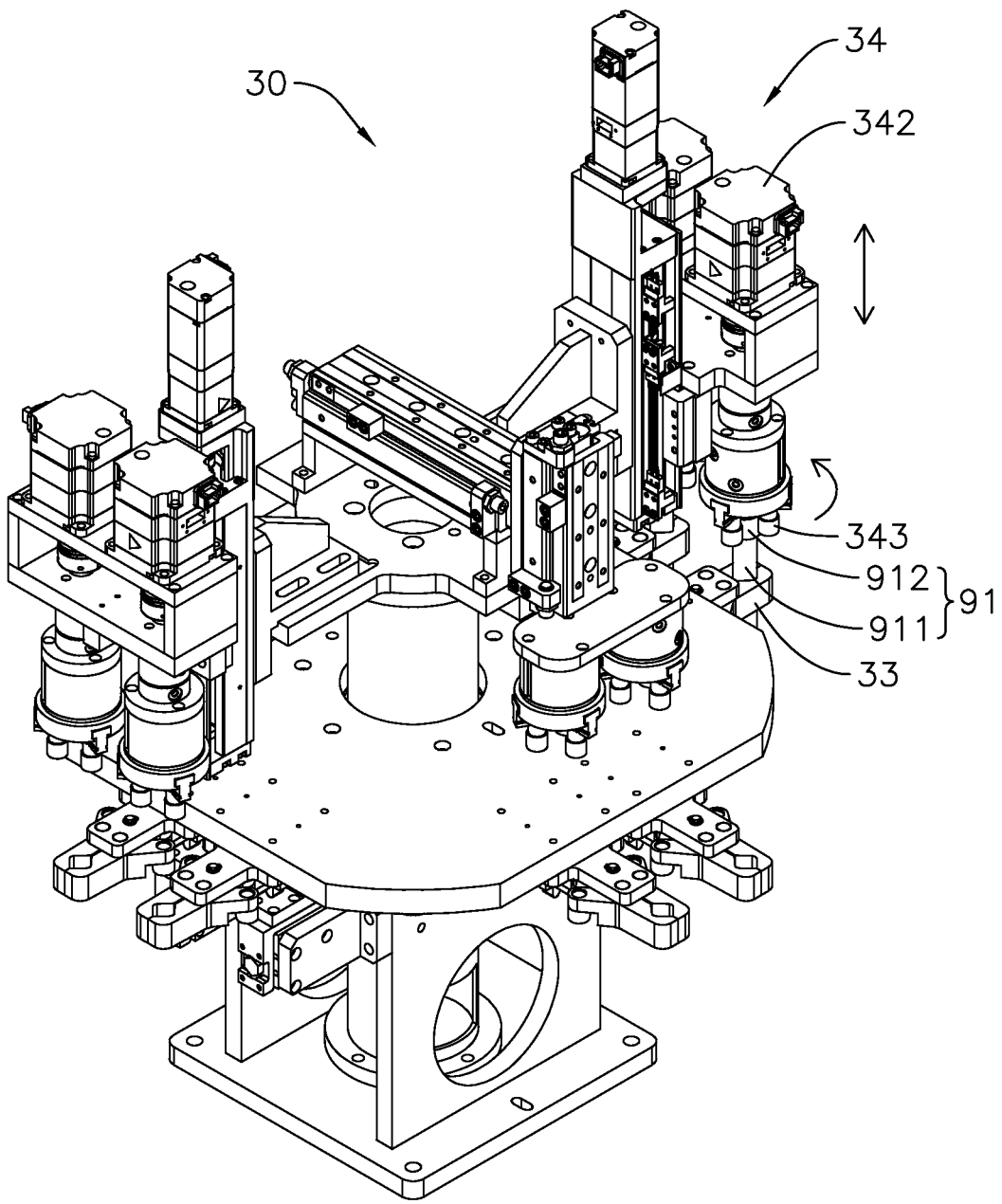
FIGS. 11 to 13 are operational perspective views of the cap mechanism of the nucleic acid extraction device in FIG. 1, showing different operating statuses of the cap mechanism.

With reference to FIGS. 9 and 11, the cap-loosening assembly 34 includes two cap-loosening linear modules 341, two cap-loosening motors 342, and two cap-loosening grippers 343. The cap-loosening linear modules 341 are mounted on the fixing seat 31 and each have a lid-opening slider 3411. The lid-opening slider 3411 is movable upwards and downwards. The cap-loosening motors 342 and the cap-loosening grippers 343 are mounted on the lid-opening slider 3411. The two cap-loosening grippers 343 are connected to shafts of the two cap-loosening motors 342 respectively such that each of the cap-loosening motors 342 is capable of rotating the respective cap-loosening gripper 343 to loosen the caps 912 of the two specimen containers 91 that are clamped by the two containing body fixtures 33 of the same set (as shown in FIG. 11).

Figure 12:
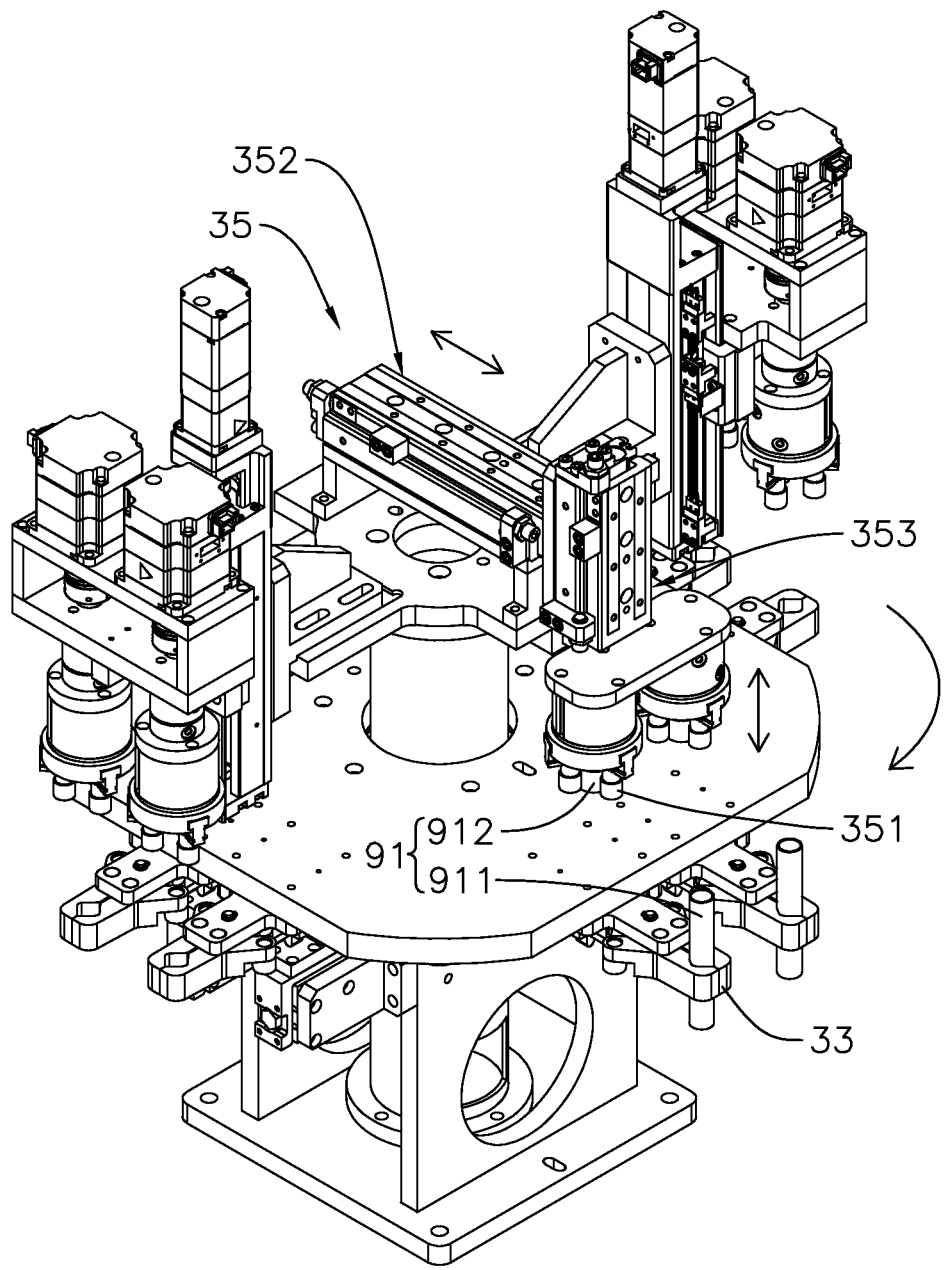

With reference to FIGS. 9 and 12, the cap-moving assembly 35 includes two cap-moving grippers 351 that are configured to clamp the two caps 912 of the two specimen containers 91 gripped by the two containing body fixtures 33 of the same set, and the two cap-moving grippers 351 are configured to move the caps 912 that are loosened by the two cap-loosening gripper 351 to a lateral side of the corresponding containing bodies 911 such that upper openings of said containing bodies 911 are uncovered (as shown in FIG. 12).

To be specific, the cap-moving assembly 35 has a first cap-moving actuator 352 and a second cap-moving actuator 353. The first cap-moving actuator 352 is preferably a gas cylinder mounted on the fixing seat 31 and has a first cap-moving block 3521. The first cap-moving block 3521 can be driven by compressed air to move relative to the fixing seat 31.

The second cap-moving actuator 353 is mounted on the first cap-moving block 3521 of the first cap-moving actuator 352 and has a second cap-moving block 3531. The second cap-moving block 3531 is movable upwards and downwards. A moving direction of the first cap-moving block 3521 is non-parallel to a moving direction of the second cap-moving block 3531, and said two moving directions are preferably perpendicular.

To be more specific, the first cap-moving block 3521 is controllable such that it is linearly movable along a rotation axis of the rotating table 32 to change a distance between the second cap-moving actuator 353 and the rotation axis L1.

The two cap-moving grippers 351 are mounted on the second cap-moving block 3531 of the second cap-moving actuator 353 such that the cap-moving gripper 351 can first be moved horizontally over one of the specimen containers 91, and then the second cap-moving actuator 353 moves downward to clamp the cap 912, and then separates the cap 912 from the corresponding containing body 911 via the cap-moving actuators 352, 353.

Figure 13:
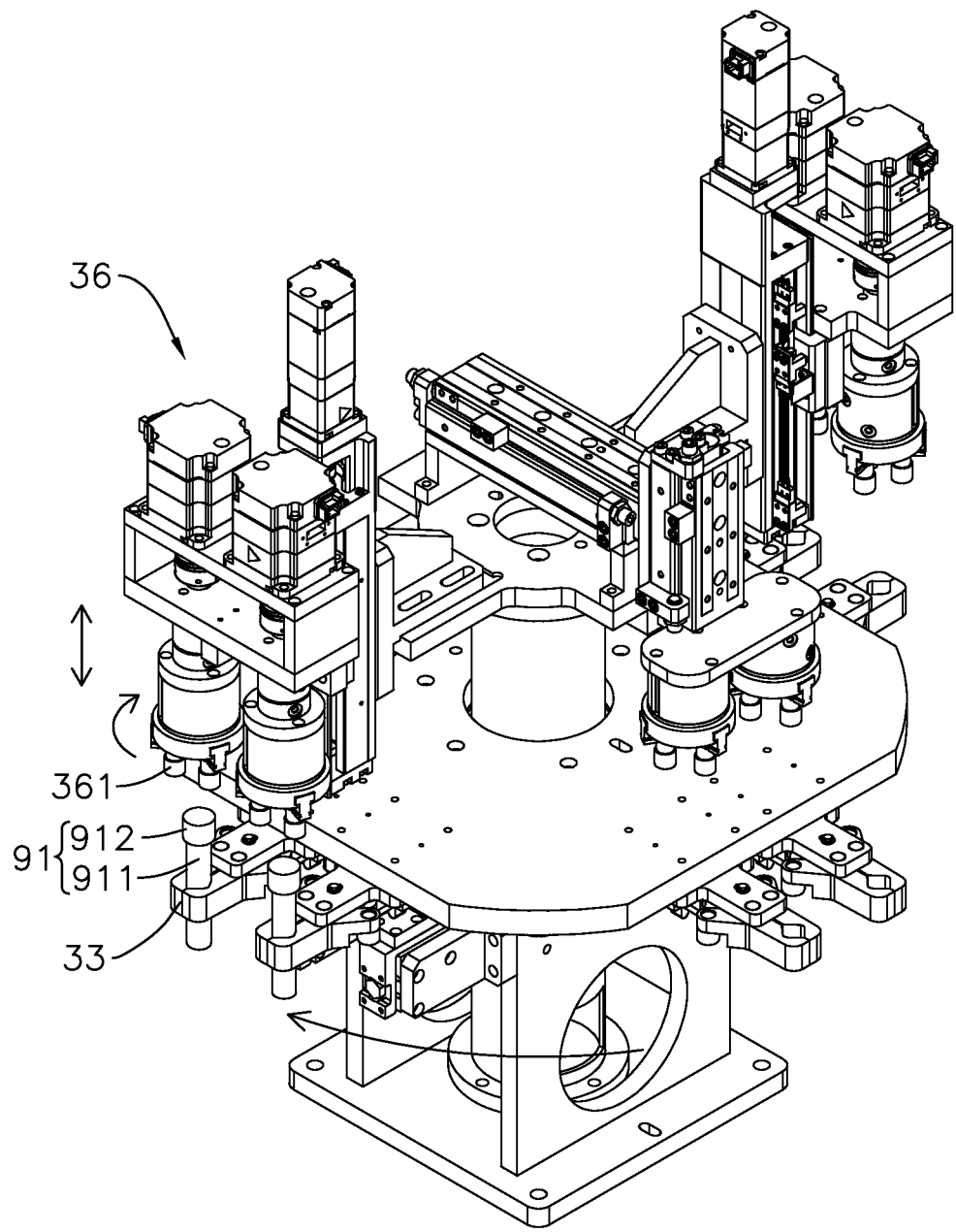
Figure 14:
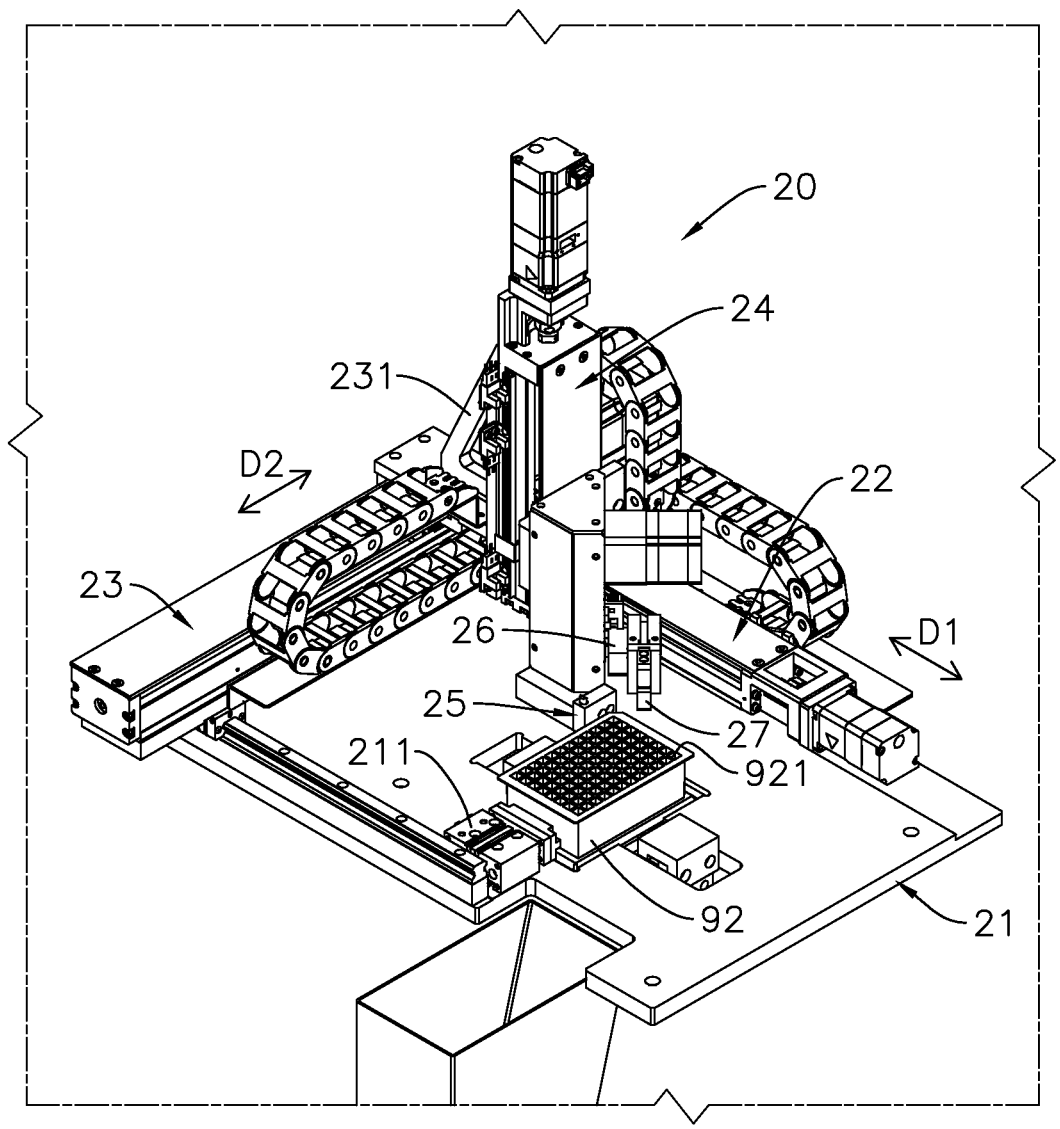
FIG. 14 is a perspective view of a film-flipping mechanism of the nucleic acid extraction device in FIG. 1.

With reference to FIGS. 9 and 13, the cap-tightening assembly 36 has two cap-tightening grippers 361 configured to clamp two of the caps 912 of the two specimen containers 91 that are clamped by two of containing body fixtures 33 of the same set, and the two cap-tightening grippers 361 are configured to tighten said two cap 912 (as shown in FIG. 13). The cap-tightening assembly 36 is structurally same as the cap-loosening assembly 34, and therefore detailed structure is omitted.

With reference to FIGS. 10 to 13, the cap-loosening assembly 34, the cap-moving assembly 35, and the cap-tightening assembly 36 are mounted on the fixing seat 31 and annularly disposed apart from each other around the rotation axis L1. Rotation of the rotating table 32 makes the two specimen containers 91 clamped by the two containing body fixtures 33 correspond in position to the two cap-loosening grippers 343, the two cap-moving grippers 351, and the two cap-tightening grippers 361 in a sequential manner such that the grippers 343, 351, 361 loosen, move, and tighten the caps 912 in a sequential manner.

Figure 5:
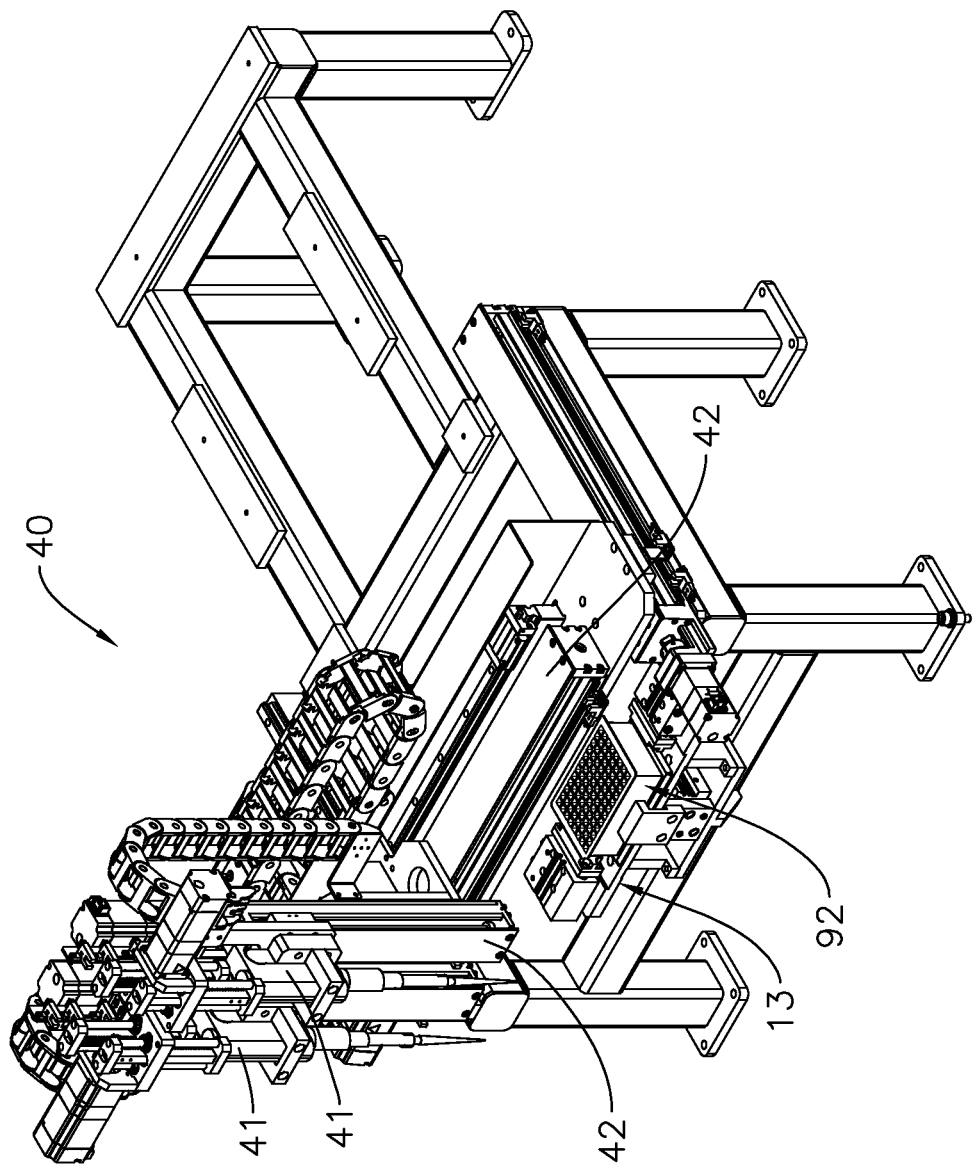
FIG. 5 is a perspective view of a dispensing mechanism of the nucleic acid extraction device in FIG. 1.
Figure 23:
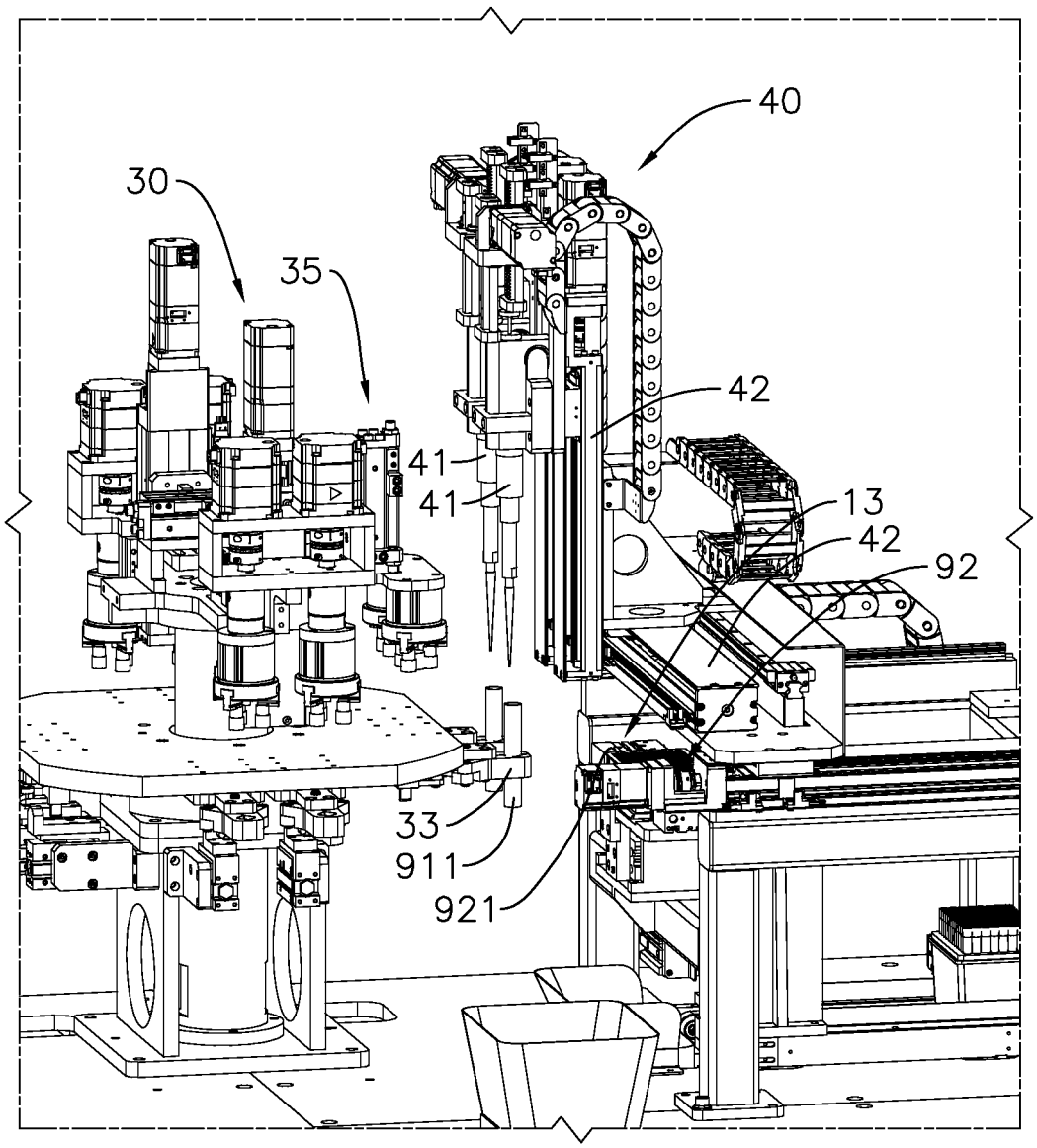
FIG. 23 is another perspective view of the nucleic acid extraction device in FIG. 1.

With reference to FIGS. 1, 5, and 23, the dispensing mechanism 40 has two pipettes 41. Each of the two pipettes 41 is configured to aspirate the specimen in a respective one of the two specimen containers 91 that are clamped by the two cap-moving grippers 351, and then inject the aspired specimen into one of the extraction recesses 921 of the extraction plate 92. To be precise, the dispensing mechanism 40 has multiple dispensing linear modules 42 that are serially connected such that the dispensing linear modules 42 allow the pipettes 41 to be positioned above the main base with multiple degrees of freedom. The dispensing mechanism 40 is a conventional mechanism, and therefore detailed description is omitted.

Figure 6:
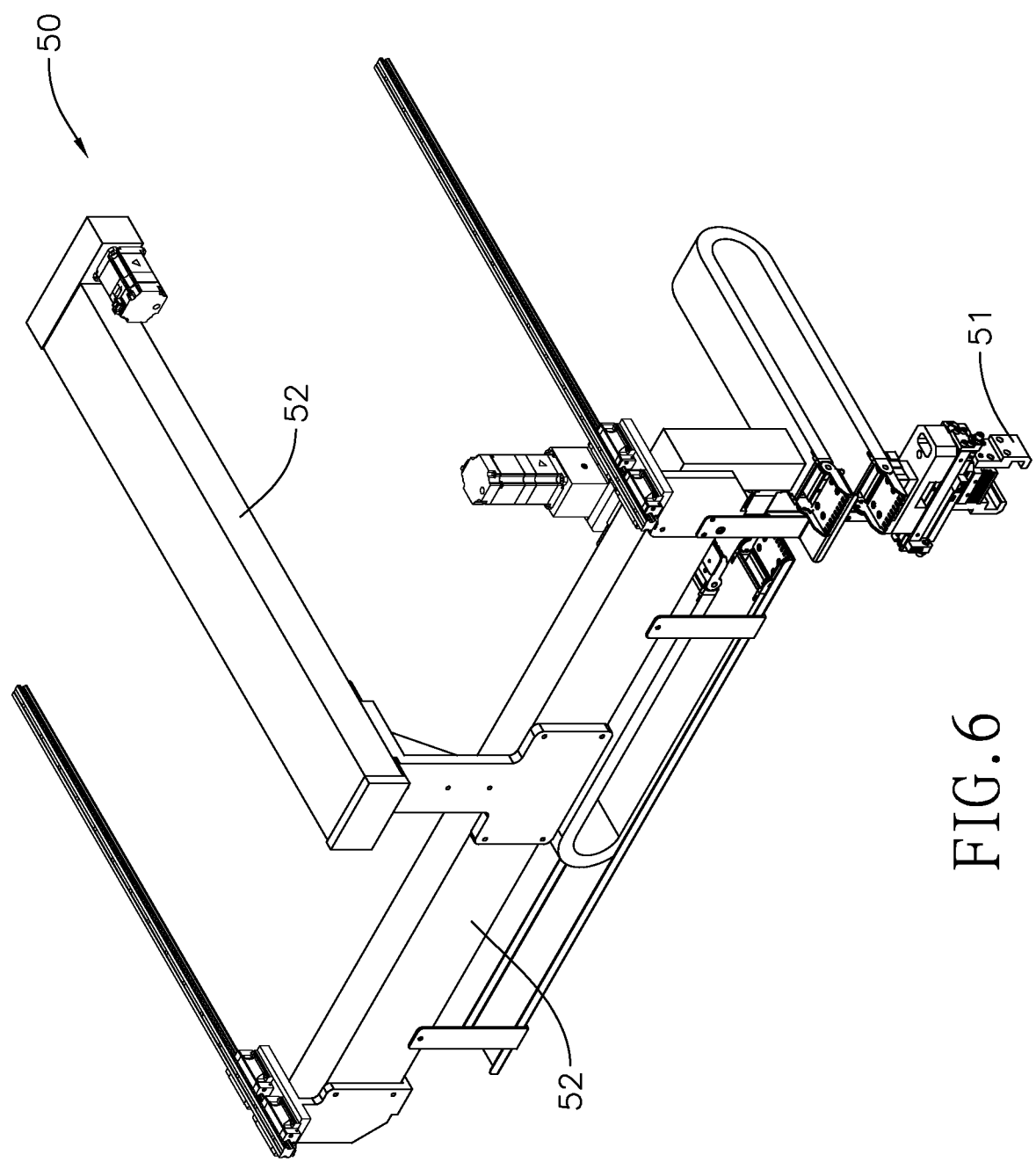
FIG. 6 is a perspective view of a dispensing mechanism of the nucleic acid extraction device in FIG. 1.

With reference to FIGS. 1 and 6, the extraction plate transfer mechanism 50 is configured to move the extraction plate 92 having the specimens injected in the extraction recesses 921 to the nucleic acid extraction module 60 (as shown in FIG. 1). To be specific, the extraction plate transfer mechanism 50 is mounted under transverse beams (not shown in figures) that are disposed over the main base 10.

The extraction plate transfer mechanism 50 has a plate gripper 51 and multiple plate transfer linear modules 52 that are serially connected. The plate gripper 51 is configured to clamp the extraction plates 92; the plate transfer linear modules 52 allow the plate gripper 51 to be positioned above the main base 10 with multiple degrees of freedom. The extraction plate transfer mechanism 50 is a conventional mechanism, and therefore detailed description is omitted.

The nucleic acid extraction module 60 is a conventional standard molecular testing instrument, and therefore detailed description is omitted.

Figure 24:
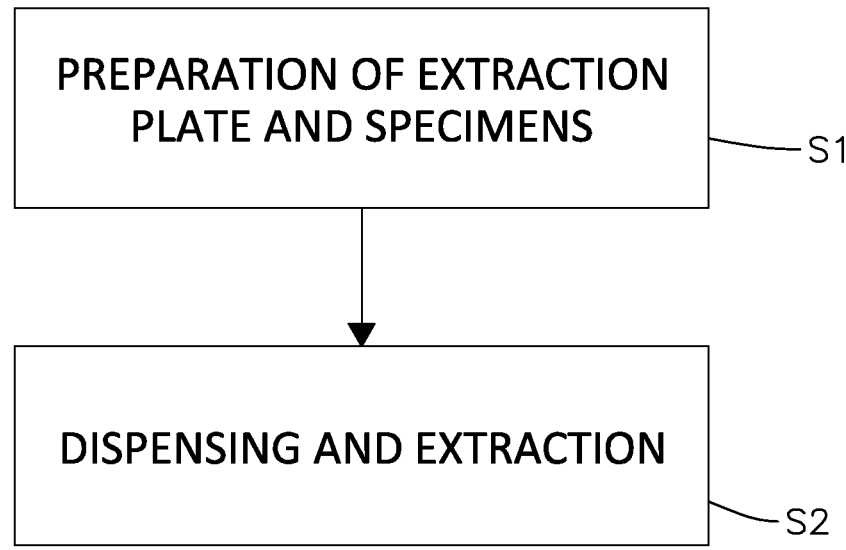
FIG. 24 is a flow chart of a nucleic acid extraction method for molecular testing in accordance with the present invention.

With reference to FIG. 24, a nucleic acid extraction method for molecular testing in accordance with the present invention comprises the following steps: the first step (S1) is preparation of extraction plate and specimens; the second step (S2) is dispensing and extraction. The nucleic acid extraction method is preferably performed by the aforementioned nucleic acid extraction device, but not limited thereto.

Figure 15:
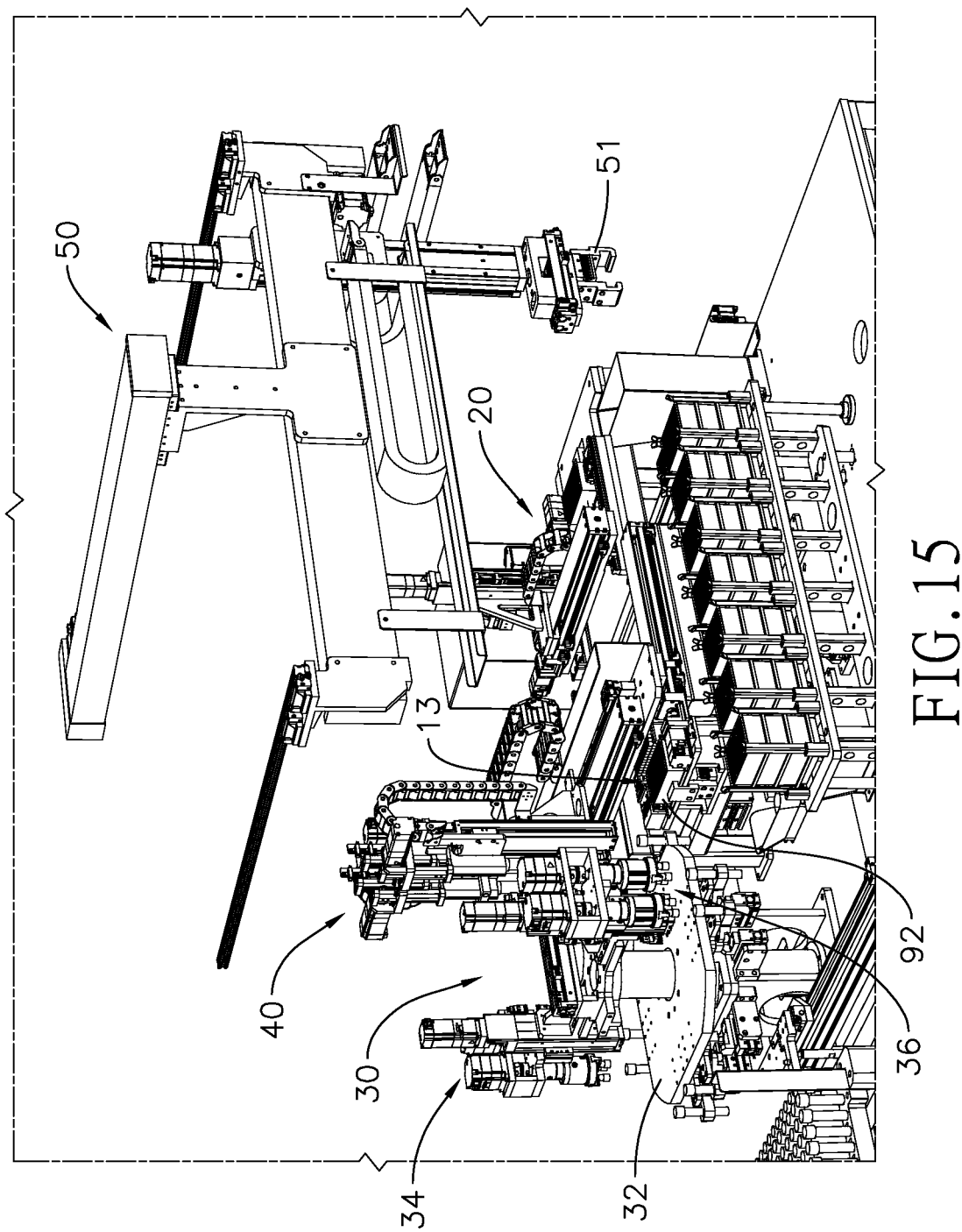
FIG. 15 is an enlarged perspective view of the nucleic acid extraction device in FIG. 1.

Preparation of extraction plate (S1): with reference to FIGS. 1 and 15, prepare the extraction plates 92 and put the extraction plates 92 in the plate rack 11 on the main base 10. Then, the extraction plate transfer mechanism 50 moves one of the extraction plates 92 from the plate rack 11 to the film-flipping seat 21 of the film-flipping mechanism 20 and fix said extraction plate 92 onto the film-flipping seat 21.

With reference to FIGS. 18 to 20, the film-flipping head 251 of the film-flipping mechanism 20 is moved to a position under the flange 923 of the extraction plate 92, and the top of the film-flipping head 251 abuts upwards against the bottom surface of the flange 923, and meanwhile moves the film-flipping head 251 toward the folded peripheral portion 9221 of the sealing film 922 to push the folded peripheral portion 9221 such that the folded peripheral portion 9221 is flipped from the underside of the flange 923 to the lateral side of the flange 923.

With reference to FIGS. 21 and 22, then the film gripper 27 clamps the folded peripheral portion 9221 that is flipped to the lateral side of the flange 923, and then the film gripper 27 moves and rotates to peel the sealing film 922 away from the extraction plate 92 such that the openings of the extraction recesses 921 are exposed. After removing the sealing film 922, the extraction plate transfer mechanism 50 moves the extraction plate 92 to the receiving area 13 that is adjacent to the dispensing mechanism 40.

With reference to FIGS. 1, 7, and 10, while the extraction plate transfer mechanism 50 and the film-flipping mechanism 20 are in operation, the specimen transfer module 80 moves the specimen containers 91 on the organizing area 12 to the cap mechanism 30 simultaneously and clamps two of the specimen containers 91 with one set of the containing body fixtures 33.

Then, the rotating table 32 rotates 90 degrees to make said specimen containers 91 correspond in position to the cap-loosening assembly 34 (as shown in FIG. 11). The cap-loosening grippers 343 loosen the caps 912 of the specimen containers 91.

After loosening the caps 912, the rotating table 32 rotates 90 degrees again to make the specimen containers 91 correspond in position to the cap-moving assembly 35 (as shown in FIG. 12). Then, the cap-moving grippers 351 separate the cap 912 from the containing bodies 911 and move the caps 912 to the lateral side of the containing bodies 911 such that upper openings of the containing bodies 911 are exposed.

Dispensing and extraction (S2): with reference to FIG. 23, the two pipettes 41 of the dispensing mechanism 40 aspirate the specimens inside two of the specimen containers 91 corresponding in position to the cap-moving assembly 35, and then inject the aspirated specimens into two of the extraction recesses 921 of the extraction plate 92.

After injecting the specimens, the cap-moving grippers 351 of the cap mechanism 30 moves the caps 912 back to the containing bodies 911 (status not shown in figures), the rotating table 32 rotates 90 degrees again to make the specimen containers 91 correspond in position to the cap-tightening assembly 36 (as shown in FIG. 13). The cap-tightening grippers 361 tighten the caps 912 to the corresponding containing bodies 911 to seal the residual specimens in the specimen containers 91, and then the rotating table 32 rotates 90 degrees again and the specimen transfer module 80 moves the specimen containers 91 back to the specimen-organizing plate 93.

Then, the specimen transfer module 80, the cap mechanism 30, and the dispensing mechanism 40 continue to process rest of the specimen containers 91 such that rest of the specimens in said specimen containers 91 are injected into rest of the extraction recesses 921 on the extraction plate 92.

Finally, the extraction plate transfer mechanism 50 moves the extraction plate 92 with the specimens inside the extraction recesses 921 to the nucleic acid extraction module 60 where nucleic acid extraction process is performed.

After finishing nucleic acid extraction, the extraction plate transfer mechanism 50 removes the extraction plate 92 from the nucleic acid extraction module 60 and moves the extraction plate 92 to an extraction plate output mechanism 94 (as shown in FIG. 2). The extraction plate 92 on the extraction plate output mechanism 94 is then clamped by another device not belonging to the present invention to perform subsequent molecular testing processes.

In summary, the film-flipping mechanism 20 automatically separates the sealing film 922 from the extraction plate 92; the cap mechanism 30 automatically opens up the specimen container 91; the dispensing mechanism 40 automatically transfers the specimens from the specimen containers 91 to the extraction plates 92; the extraction plate transfer mechanism 50 automatically moves the extraction plate 92 to the nucleic acid extraction module 60 to perform nucleic acid extraction process. As a result, nucleic acid extraction is highly automated to greatly reduce labor and improve processing quality.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A nucleic acid extraction device for performing molecular tests and configured to process an extraction plate and specimen containers wherein the extraction plate includes a flange, an extraction container top and an extraction container outer annular surface on the extraction container top, the flange includes a flange outer edge, a flange bottom surface, a flange underside and a flange lateral side and protruding from the extraction container outer annular surface and each specimen container of the specimen containers includes a corresponding containing body and a corresponding cap wherein each corresponding containing body of each specimen container of the specimen containers includes a corresponding specimen and is sealed by the corresponding cap wherein the extraction plate includes extraction plate recesses, an extraction plate top, and a sealing film adhered onto the extraction container top and sealing the extraction plate recesses wherein the sealing film includes a sealing film folded peripheral portion and is folded along the flange outer edge, the nucleic acid extraction device comprising:
   a main base;
   a film-flipping mechanism;
   a film-flipping seat;
   a film-flipping assembly;
   a film-flipping head;
   a film gripper;
   a cap mechanism;
   a dispensing mechanism;
   at least one pipette;
   a nucleic acid extraction module; and
   an extraction plate transfer mechanism; wherein
   the film-flipping mechanism is mounted on the main base and is configured to remove the sealing film from the extraction plate;
   the film gripper is movably and rotatably disposed on the film-flipping seat and configured to clamp the sealing film folded peripheral portion flipped to the flange lateral side and peel the sealing film away from the extraction plate;
   the cap mechanism is mounted on the main base and is configured to separate the corresponding cap of each specimen container of the specimen containers from the containing body;
   the dispensing mechanism is mounted on the main base and includes the at least one pipette wherein each pipette of the at least one pipette is configured to aspirate the corresponding specimen in the corresponding specimen container of the specimen containers and inject the aspirated specimen into the corresponding extraction plate recess;
   the nucleic acid extraction module is mounted on the main base;
   the extraction plate transfer mechanism is mounted on the main base and is configured to move the extraction plate with the corresponding specimens injected in the corresponding extraction plate recess to the nucleic acid extraction module wherein the film-flipping mechanism comprises: the film-flipping seat mounted on the main base and configured to securely hold the extraction plate; and the film-flipping assembly mounted on the film-flipping seat and configured to move the sealing film folded peripheral portion wherein the film-flipping assembly includes:

a film-flipping assembly top surface; and the film-flipping head protruding from the film flipping assembly top surface and is configured to abut against the flange bottom surface and move to the folded peripheral portion; wherein the film-flipping head includes a film-flipping head side surface and is configured to unfold the sealing film folded peripheral portion by pushing the sealing film folded peripheral portion when the film-flipping assembly moves to the sealing film folded peripheral portion, a such that the sealing film folded peripheral portion flips from the flange underside to the flange lateral side.

2. The nucleic acid extraction device as claimed in claim 1, wherein the cap mechanism comprises a fixing seat mounted on the main base;

a rotating table mounted on the fixing seat and configured to rotated about a rotation axis;

at least one containing body fixture mounted on the rotating table wherein each containing body fixture of the at least one containing body fixture is configured to clamp a particular specimen container of the specimen containers;

a cap-loosening assembly having at least one cap-loosening gripper configured to clamp the cap of the particular specimen container clamped by the at least one containing body fixture wherein the at least one cap-loosening gripper is configured to loosen said cap;

a cap-moving assembly having at least one cap-moving gripper configured to clamp the cap of the particular specimen container clamped by the at least one containing body fixture wherein the at least one cap-moving gripper configured to move the cap of the particular specimen container loosened by the at least one cap-loosening gripper to a lateral side of the corresponding containing body of a corresponding specimen container of the specimen containers;

a cap-tightening assembly having at least one cap-tightening gripper configured to clamp the cap of the particular specimen container loosened by the at least one cap-loosening gripper and tightening said cap; wherein the cap-loosening assembly, the cap-moving assembly, and the cap-tightening assembly are mounted on the fixing seat, are disposed above the rotating table, and are separately arranged around the rotation axis; and rotation of the rotating table enables the particular specimen container clamped by the at least one containing body fixture to correspond in first position to the at least one cap-loosening gripper, in a second position to the at least one cap-moving gripper, and in a third position to the at least one cap-tightening gripper in a sequential manner.

3. The nucleic acid extraction device as claimed in claim 2, wherein the cap-loosening assembly of the cap mechanism comprises:

a cap-loosening linear module mounted on the fixing seat and having a lid-opening slider configured to move upwards and downwards;

at least one cap-loosening motor mounted on the lid-opening slider; wherein the at least one cap-loosening gripper is mounted to the lid-opening slider of the cap-loosening linear module and is connected to the at least one cap-loosening motor such that the at least one cap-loosening motor is capable of rotating the at least one cap-loosening gripper to loosen the cap clamped by the at least one cap-loosening gripper.

4. The nucleic acid extraction device as claimed in claim 2, wherein the cap-moving assembly comprises:

a first cap-moving actuator mounted on the fixing seat and having a first cap-moving block configured to move relative to the fixing seat; and a second cap-moving actuator mounted on the first cap-moving block and having a second cap-moving block configured to move upwards and downwards; wherein the first cap-moving block is configured to move in a first moving direction and the second cap-moving block is configured to move in a second moving direction wherein the first moving direction is non-parallel relative to the second moving direction; and the at least one cap-moving gripper is mounted to the second cap-moving block.

5. The nucleic acid extraction device as claimed in claim 3, wherein the cap-moving assembly comprises:

a first cap-moving actuator mounted on the fixing seat and having a first cap-moving block configured relative to the fixing seat; and a second cap-moving actuator mounted on the first cap-moving block and having a second cap-moving block configured to move upwards and downwards; wherein the first cap-moving block is configured to move in a first moving direction and the second cap-moving block is configured to move in a second moving direction wherein the first moving direction is non-parallel relative to the second moving direction; and the at least one cap-moving gripper is mounted to the second cap-moving block.

6. The nucleic acid extraction device as claimed in claim 2, wherein the main base comprises an organizing area for one or more specimen containers to queue at prior to processing; and wherein the nucleic acid extraction device further comprises a specimen transfer module mounted on the main base and having a container gripper configured to move between the organizing area and the at least one containing body fixture of the cap mechanism and configured to clamp a specimen container of the one or more specimen containers on the organizing area and move said specimen container to the at least one containing body fixture.

7. The nucleic acid extraction device as claimed in claim 3, the main base comprises an organizing area for one or more specimen containers to queue at prior to processing; and wherein the nucleic acid extraction device further comprises a specimen transfer module mounted on the main base and having a container gripper configured to move between the organizing area and the at least one containing body fixture of the cap mechanism and configured to clamp a specimen container of the one or more specimen containers on the organizing area and configured to move said specimen container to the at least one containing body fixture.

\* \* \* \* \*